(12) United States Patent
Yamazaki

(10) Patent No.: US 6,900,911 B1
(45) Date of Patent: May 31, 2005

(54) IMAGE PROCESSING APPARATUS AND IMAGE CORRECTING METHOD

(75) Inventor: Yoshirou Yamazaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/384,585

(22) Filed: Aug. 27, 1999

(30) Foreign Application Priority Data

Sep. 9, 1998 (JP) ............................................. 10-255281

(51) Int. Cl.$^7$ .......................... H04N 1/409; H04N 1/58
(52) U.S. Cl. ..................................... 358/3.26; 358/530
(58) Field of Search ................................. 382/254, 165, 382/112, 275; 358/302, 296, 456, 1.9, 3.26, 501, 527, 530–532; 396/562, 563, 569, 208, 210, 211, 311, 310

(56) References Cited

U.S. PATENT DOCUMENTS

| 4,532,558 A | * | 7/1985 | Oota et al. ................... 386/117 |
| 5,767,983 A | * | 6/1998 | Terashita ..................... 358/302 |
| 5,768,403 A | * | 6/1998 | Suzuki et al. ................. 358/2.1 |
| 5,828,461 A | * | 10/1998 | Kubo et al. .................. 358/296 |
| 6,005,680 A | * | 12/1999 | Luther et al. ................. 358/2.1 |
| 6,067,109 A | * | 5/2000 | Yamana ........................ 348/96 |
| 6,233,066 B1 | * | 5/2001 | Kojima et al. ............... 358/488 |
| 6,421,146 B1 | * | 7/2002 | Yoo ............................ 358/461 |

FOREIGN PATENT DOCUMENTS

| JP | 1094763 A | 4/1989 | ............ H04N/1/40 |
| JP | 6233134 A | 8/1994 | ............ H04N/1/40 |
| JP | 9181919 A | 7/1997 | .......... H04N/1/409 |

\* cited by examiner

*Primary Examiner*—Scott A. Rogers
(74) *Attorney, Agent, or Firm*—Birch, Stewart, Kolasch & Birch, LLP

(57) ABSTRACT

An image correcting method is provided which comprising the steps of: reading an image recorded on a recording material, obtaining image characteristic data based on a result of the reading, and storing the obtained image characteristic data in storage means, and thereafter, when an image recorded on the recording material is read, obtaining image characteristic data from image data obtained by the latter reading; based on the obtained image characteristic data and the image characteristic data stored in the storage means, calculating a correction parameter for correcting image quality deterioration of the image; and correcting the image data based on the calculated correction parameter. Accordingly, image quality deterioration of an image caused by storage environmental conditions or aged deterioration of the recording material can be corrected precisely.

24 Claims, 13 Drawing Sheets

F I G. 4
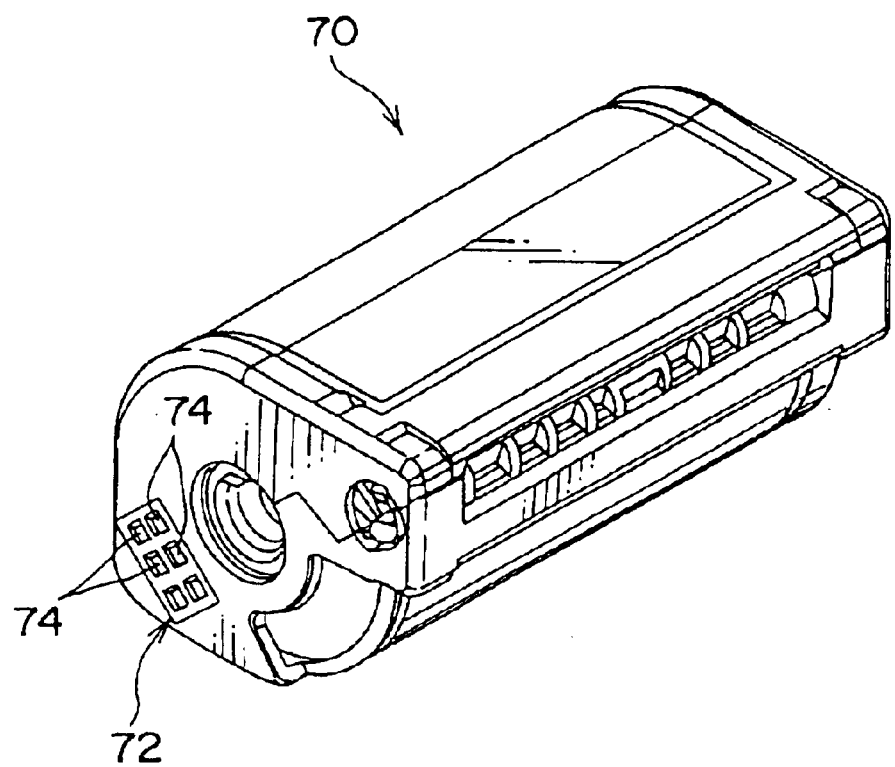

FIG. 7A
IMAGE CHARACTERISTIC DATA DURING FIRST IMAGE OUTPUT

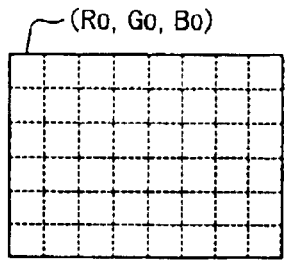
(Ro, Go, Bo)

FIG. 7B
SPECTRAL SENSITIVITY CHARACTERISTICS OF SCANNER USED DURING FIRST IMAGE OUTPUT

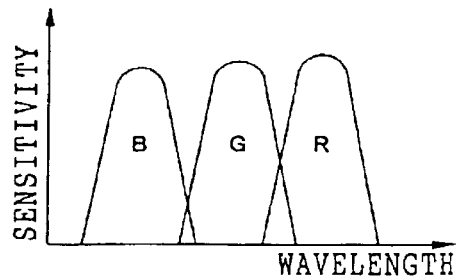

FIG. 7C
IMAGE DATA OBTAINED BY READING AFTER IMAGE QUALITY DETERIORATION

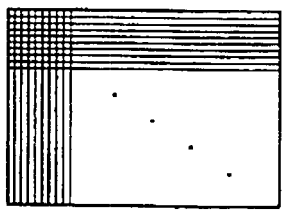

FIG. 7D
SPECTRAL SENSITIVITY CHARACTERISTICS OF SCANNER USED FOR READING AFTER IMAGE QUALITY DETERIORATION

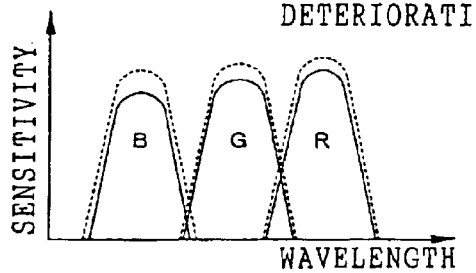

FIG. 7E
IMAGE CHARACTERISTIC DATA OBTAINED AFTER CORRECTION FOR DIFFERENCE OF SPECTRAL SENSITIVITY CHARACTERISTICS FOR IMAGE DATA SHOWN IN FIG. 7C

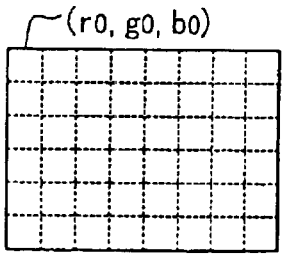
(ro, go, bo)

FIG. 7F
CORRECTION PARAMETERS OBTAINED FOR EVERY BLOCK (DIFFERENCE BETWEEN IMAGE CHARACTERISTIC DATA (A) AND (E))

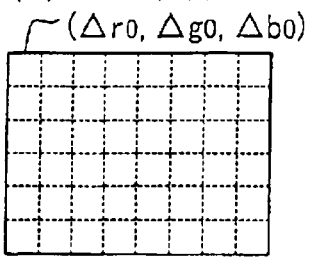
($\Delta$ro, $\Delta$go, $\Delta$bo)

WHEREIN, $\Delta ro = Ro - ro$
$\Delta go = Go - go$
$\Delta bo = Bo - bo$

FIG. 7G
CORRECTION PARAMETER OBTAINED FOR EACH PIXEL

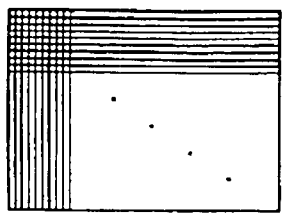

F I G. 8 A
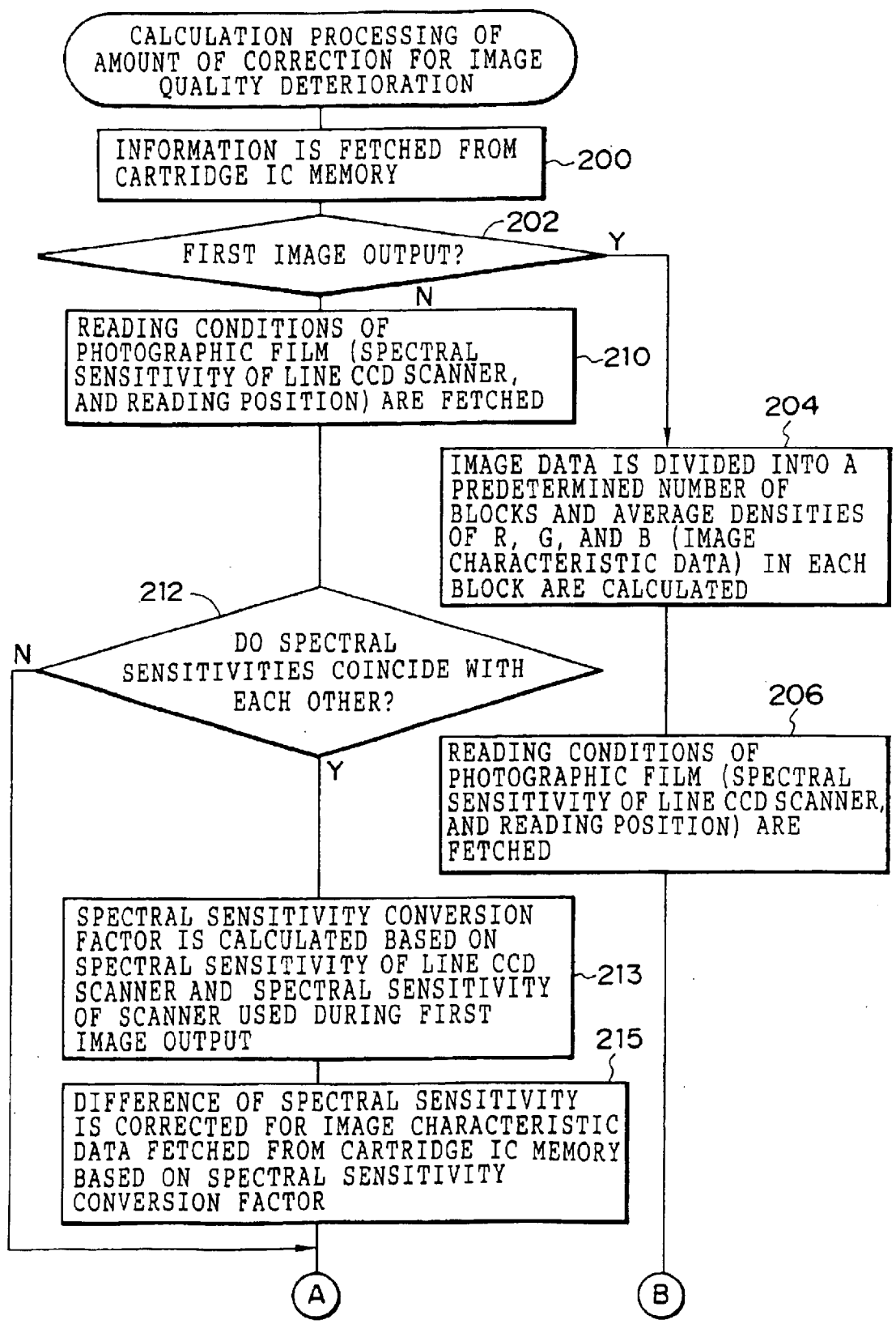

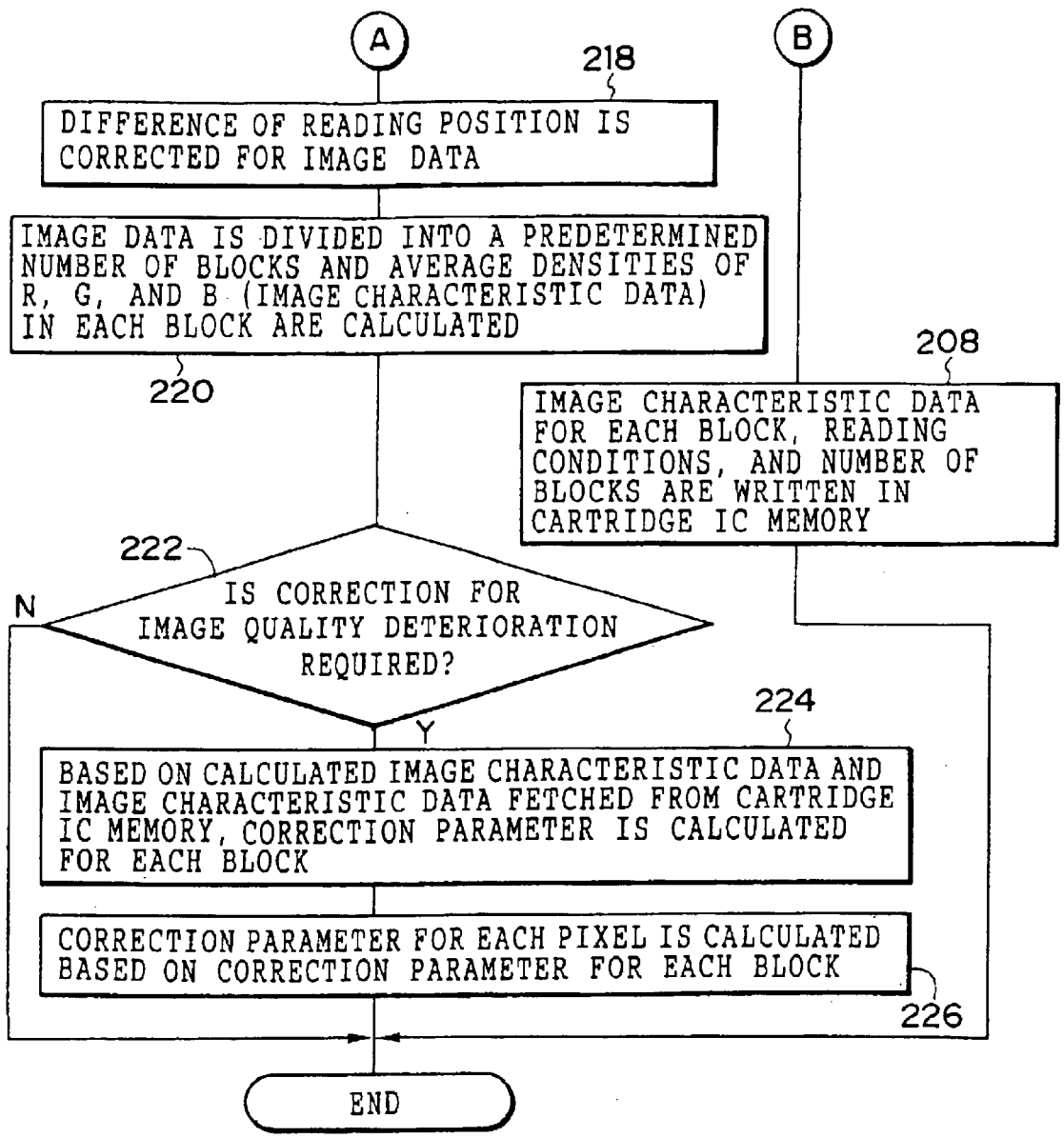
F I G. 8 B

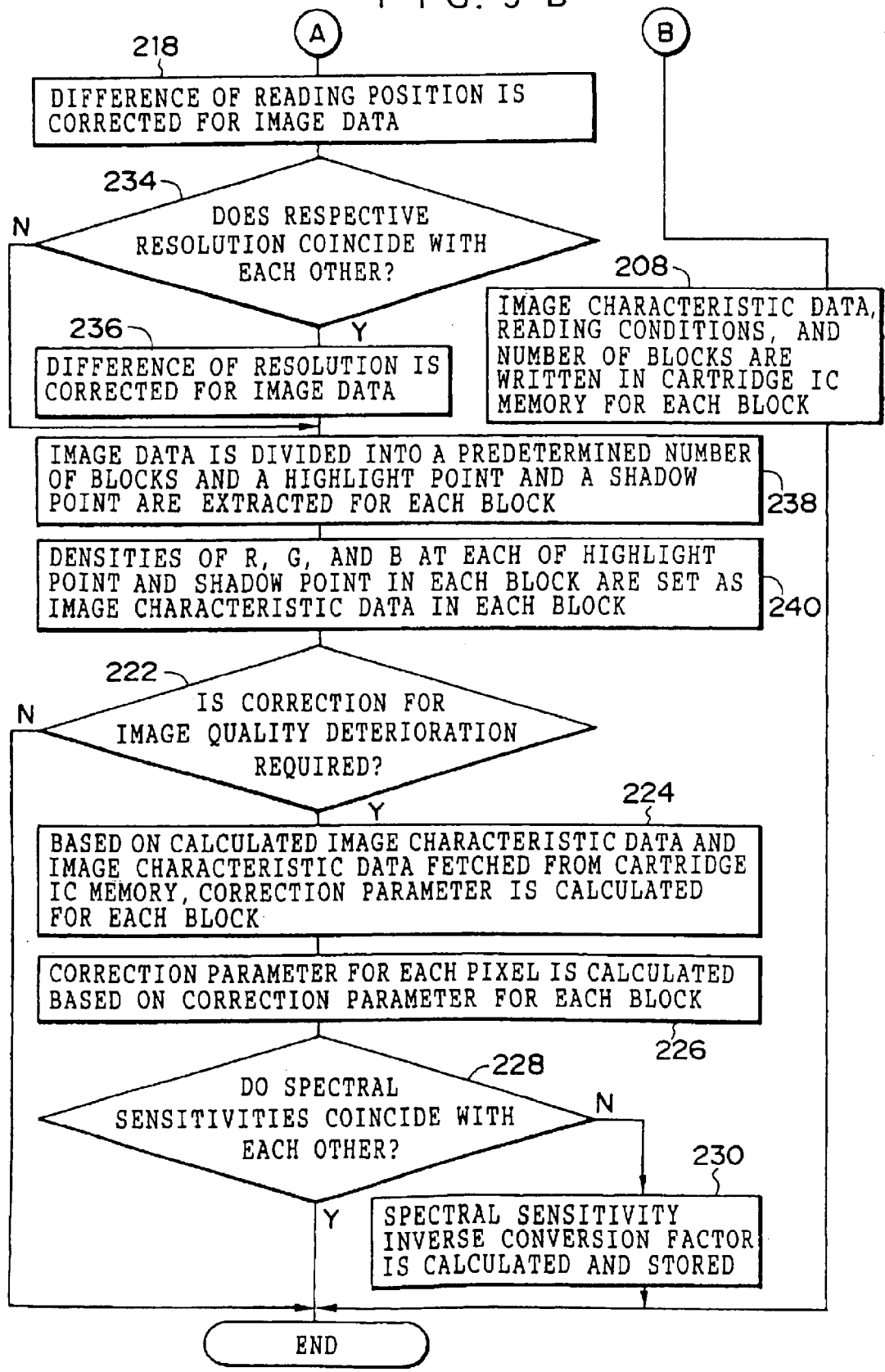

SPECTRAL SENSITIVITY CHARACTERISTICS OF SCANNER USED DURING FIRST IMAGE OUTPUT

SPECTRAL SENSITIVITY CHARACTERISTICS OF SCANNER USED AFTER IMAGE QUALITY DETERIORATION

CORRECTION OF IMAGE DATA CORRESPONDING TO DIFFERENCE OF SPECTRAL SENSITIVITY CHARACTERISTICS

IMAGE PROCESSING APPARATUS AND IMAGE CORRECTING METHOD

BACKGROUND OF THE INVENTION

1. Field of the Invention

The present invention relates to an image processing apparatus and an image correcting method, and particularly to an image correcting method, in which image data by which deterioration in image quality of an image recorded on a recording material is corrected is obtained from the image, and an image processing apparatus to which the image correcting method can be applied.

2. Description of the Related Art

It has been known that, when a long period of time has elapsed after processing such as development for a film image, which is exposed and recorded on a photographic film and is further subjected to processing such as development so as to be made visible, color dye deteriorates under the influence of storage environmental conditions or aged deterioration of the photographic film, thereby causing image quality deterioration such as so-called color dye fading. For this reason, there is a drawback in that a finished state of a photographic print prepared by exposing and recording a film image on a photographic printing paper a long period of time after processing such as development for the film image differs from a finished state of a photographic print prepared directly after processing such as development. Particularly, in a large-size photographic film such as a Brownie-size film, which makes a demand for image quality of a high level, a great problem arises in which the finished state of a photographic print varies depending on the time th photographic print is prepared.

On the other hand, there has conventionally been known an image processing system in which image processing including various corrections is carried out for image data obtained by reading an image recorded on a photographic film, and the image is recorded on a photographic printing paper or the like based on the image data obtained after the image processing, or the image data obtained after the image processing is stored in an information storage medium. In this type of image processing system, the quality of a recorded image can be controlled relatively arbitrarily by the image processing for the image data. Accordingly, in order to solve the aforementioned problem, an attempt at correcting, by image processing, image quality deterioration of a film image which is caused under the influence of storage environmental conditions or aged deterioration of the photographic film has been made.

However, the storage environmental conditions of the photographic film, or the length of time having elapsed after processing such as development varies greatly every photographic film, and therefore, the degree of image quality deterioration of a film image also varies. Accordingly, the precision of correction for image quality deterioration of each film image has not necessarily reached a proper level.

SUMMARY OF THE INVENTION

The present invention has been devised in view of the above-described facts and an object thereof is to provide an image processing apparatus and an image correcting method in which image quality deterioration of an image caused under the influence of storage environmental conditions or aged deterioration of a recording material can be precisely corrected.

In order to achieve the above-described object, there is provided an image processing apparatus of a first aspect of the present invention, which comprises: reading means for reading an image recorded on a recording material; acquisition means for acquiring image characteristic data which, when an image recorded on the recording material was formerly read, was obtained based on a result of the former reading and stored in storage means; calculation means which calculates, based on image characteristic data obtained from image data obtained by the reading of the reading means, and image characteristic data acquired by the acquisition means, a correction parameter for correcting image quality deterioration of the image; and correction means which corrects, based on the correction parameter calculated by the calculation means, the image data.

In the first aspect of the present invention, an image recorded on the recording material is read by the reading means. The recording material according to the present invention may be, for example, a photographic photosensitive material such as a photographic film or a photographic printing paper or may be other photographic photosensitive materials, and further, it may also be other recording materials such as plain paper and heat sensitive paper. Further, when the image recorded on the recording material was formerly read, the storage means stores therein image characteristic data obtained based on a result of the former reading, and the image characteristic data is acquired by the acquisition means.

It suffices that the image characteristic data according to the present invention is data which represents an image characteristic amount which varies depending on variation in image quality of an image. However, image quality deterioration of an image caused by storage environmental conditions or aged deterioration of the recording material is a change of relatively low spatial frequency components such that density of an image entirely decreases, and therefore, it is preferable that the image characteristic data is an image characteristic amount which varies depending on a change of low frequency components in a spatial frequency spectrum of an image. So long as the image characteristic data is data which represents an image characteristic amount which varies depending on the change of low frequency components of an image, data quantity of the image characteristic data can be lessened. Accordingly, a storage capacity of the storage means can be made smaller, and further, the calculation of the correction parameter or the correction of image data can be carried out by simple processing at a high speed.

The image characteristic amount whose value varies depending on a change of low frequency components of an image may be an image characteristic amount obtained from an entire surface of the image (such as average densities for every wavelength region (for example, for each of colors R, G, and B, each of narrower wavelength regions, or the like) on an entire image surface or, and densities at a highlight point and a shadow point of an entire image surface for every wavelength region). Alternatively, in a fifth aspect of the present invention, there is provided an image characteristic amount for each of a fixed number of blocks into which the image is divided (such as average densities for every wavelength region of each block, and densities at a highlight point and a shadow point in each block for every wavelength region).

The image characteristic data acquired by the acquisition means represents image quality of an image recorded on the recording material when the image was formerly read, and image characteristic data acquired from image data obtained by reading of the reading means represents image quality of an image at the present time (when the image is read by the reading means). For this reason, when image quality deterioration of an image is caused under the influence of storage environmental conditions or aged deterioration of the recording material in a period of time from the time the image was formerly read to the present time, the image characteristic data obtained from the image data differs from the image characteristic data acquired by the acquisition means depending on the image quality deterioration in the above-described period of time, and a difference between the image characteristic data obtained from the image data and the image characteristic data acquired by the acquisition means becomes a value which indicates a manner in which image quality deteriorates in the above-described period of time.

The calculation means according to the first aspect obtains image characteristic data from the image data obtained by reading of the reading means, and based on the obtained image characteristic data and the image characteristic data acquired by the acquisition means, calculates the correction parameter for correcting image quality deterioration of an image. The correction parameter can be set so that correction by the correction means becomes, for example, correction of conversion characteristic which allows conversion of the image characteristic data acquired from the image data obtained by reading of the reading means to the image characteristic data acquired by the acquisition means. As a result, it is possible to obtain a correction parameter which can precisely correct image quality deterioration of an image within the period of time from the time the image was formerly read to the present time.

When data which represents a predetermined image characteristic amount for each of a fixed number of blocks into which an image is divided is used as the image characteristic data, in the fifth aspect of the present invention, calculation means is allowed to compare the image characteristic data obtained from the image data and the image characteristic data acquired by the acquisition means with each other for each of the blocks and calculate a correction parameter for each block. The correction means effects correction of image data based on the correction parameter calculated by the calculation means, and therefore, image quality deterioration caused by storage environmental conditions or aged deterioration of the recording material can be corrected precisely.

The reading means according to the present invention may be equal to or different from reading means used when an image recorded on a recording material was formerly read (which will be hereinafter referred to as second reading means for convenience' sake). When reading conditions under which an image is read by the reading means of the present invention greatly differ from reading conditions under which an image is read by the second reading means, there is a possibility that precision of correction based on the correction parameter calculated by the calculation means may deteriorate.

An image processing apparatus according to a second aspect of the present invention is constructed to comprise: reading means for reading an image recorded on a recording material; acquisition means for acquiring image characteristic data obtained based on a result of reading when an image recorded on the recording material was formerly read, and acquiring information for specifying reading conditions in the former reading, the image characteristic data and the information being stored in storage means when the image was formerly read; calculation means which, based on the information for specifying the reading conditions acquired by the acquisition means, converts at least one of image data obtained by the reading of the reading means and image characteristic data acquired by the acquisition means so that both data each becomes data equal to that obtained by reading an image under similar reading conditions, and thereafter, obtains image characteristic data from the image data, and based on both image characteristic data, calculates a correction parameter for correcting image quality deterioration of the image; and correction means which, based on the correction parameter calculated by the calculation means, corrects the image data.

In the second aspect, when the image recorded on the recording material was formerly read, image characteristic data obtained based on a result of the reading and information for specifying reading conditions in the reading are stored in the storage means, and the stored image characteristic data and information are acquired by the acquisition means. The reading conditions can, for example, in a third aspect of the present invention, at least one of an image reading position on the recording material, a spectral sensitivity of the reading means used for the reading, and a resolution at which an image is read. Further, the calculation means in the second aspect of the present invention is provided to, based on the information for specifying the reading conditions acquired by the acquisition means, effect conversion of at least one of the image data obtained by reading of the reading means and the image characteristic data acquired by the acquisition means so that both data each become data equal to that obtained by reading an image under similar reading conditions.

As an example, when among the reading conditions, a spectral sensitivity at which an image is read by the reading means is different from a spectral sensitivity at which an image was formerly read (that is, when the spectral sensitivity in the reading means according to the present invention is different from that in the second reading means), to make the image data obtained by reading of the reading means and the image characteristic data acquired by the acquisition means into data equal to that obtained by reading an image under similar reading conditions can be realized in such a manner that, for example, with the spectral sensitivity of the second reading means specified from the acquired information being set as a reference, image data is converted in accordance with the difference in spectral sensitivity between the reading means of the present invention and the second reading means so that the image data obtained by reading becomes image data equal to that read at a spectral sensitivity similar to (preferably, equal to) the spectral sensitivity of the second reading means. In this aspect, it is necessary to effect inverse conversion so that image data corrected by the correction means is returned to image data equal to that read at the spectral sensitivity of the reading means.

Further, when respective spectral sensitivities differ from each other as described above, to make the image data obtained by reading and the acquired image characteristic data into data equal to that obtained by reading an image under similar reading conditions can also be realized in such a manner that, for example, with the spectral sensitivity of the reading means being set as a reference, image characteristic data is converted in accordance with a difference in spectral sensitivity between the reading means and the second reading means so that the acquired image characteristic data becomes image characteristic data equal to that obtained by being read at a spectral sensitivity similar to (preferably, equal to) that of the reading means.

Moreover, when among the reading conditions, the image reading position or the resolution at which an image is read differs between a case of reading an image by the reading means and a case of formerly reading an image, there are many cases in which it is difficult to convert image characteristic data for the image reading position or the resolution at which an image read. Accordingly, to make the image data read by reading and the acquired image characteristic data into data equal to that obtained by reading an image under similar reading conditions can be realized in such a manner that, for example, with the image reading position or the resolution at which an image is read when the image was formerly read, which is specified from the acquired information, being set as a reference, image data is converted in accordance with a difference of the image reading position or the resolution at which an image is read so that image data obtained by reading becomes image data equal to that read at a similar (preferably, equal) image reading position or resolution to an image reading position or resolution when an image was formerly read.

Due to the aforementioned conversion being carried out by the calculation means, the image data obtained by reading and the acquired image characteristic data each become data equal to that obtained by reading an image under similar reading conditions.

The reading conditions are comprised of a plurality of parameters, for example, an image reading position on a recording material, a spectral sensitivity of the reading means used for reading, and a resolution at which an image is read. Accordingly, so long as at least one of the image data and the image characteristic data is converted so that different parameters all become equal to one another, both data can be made into data equal to that obtained by reading an image under the same reading conditions, and correction can be made for image quality deterioration of the image at an extremely high precision. On the other hand, when precision required for correction is relatively low, even if at least one of the image data and the image characteristic data is converted so that a portion of the different parameters becomes similar (preferably, equal), both data can be made into data equal to that obtained by reading an image under similar reading conditions. As a result, a certain degree of precision of correction for image quality deterioration of the image can be obtained.

Further, the calculation means obtains image characteristic data from image data after the above-described conversion processing, and based on both image characteristic data, calculates the correction parameter for correcting image quality deterioration of the image. Accordingly, even when the reading conditions under which an image is read by the reading means greatly differ from the reading conditions under which an image was formerly read, it is possible to obtain a correction parameter which can precisely correct image quality deterioration of the image in a period of time from the time the image was formerly read to the present time.

The correction means corrects image data based on the correction parameter calculated by the calculation means, and therefore, even when reading conditions under which the image is read greatly differ from reading conditions under which the image was formerly read, image quality deterioration of an image caused by storage environmental conditions or aged deterioration of the recording material can be corrected precisely.

The storage means may be formed separately from the recording material. However, when the recording material is a photographic film, in a fourth aspect of the present invention, it is preferable that a semiconductor memory mounted to a cartridge in which the photographic film is accommodated, or a magnetic recording layer formed with a magnetic material being applied to the photographic film is provided as the storage means. As a result, there is no possibility that at least during storage of the recording material, the storage means be physically separated from the recording material, and further, an operation of data management with the recording material and data corresponding to each other can be eliminated. Accordingly, management of data becomes facilitated and occurrence of a problem in that data is lost, or the like can be prevented.

An image correcting method according to a sixth aspect of the present invention is constructed to comprise the steps of: reading an image recorded on a recording material, obtaining image characteristic data based on a result of the reading, and storing the obtained image characteristic data in storage means, and thereafter, when an image recorded on the recording material is read, obtaining image characteristic data from image data obtained by the latter reading; based on the obtained image characteristic data and the image characteristic data stored in the storage means, calculating a correction parameter for correcting image quality deterioration of the image; and correcting the image data based on the calculated correction parameter.

In the sixth aspect, an image recorded on the recording material is read and image characteristic data obtained based on a result of the reading is stored in the storage means, and based on image characteristic data obtained from image data obtained by subsequent image reading and the image characteristic data stored in the storage means, a correction parameter is calculated, and further, based on the calculated correction parameter, the image data is corrected. Accordingly, in the same manner as in the first aspect, image quality deterioration of an image caused by storage environmental conditions or aged deterioration of a recording material can be corrected precisely.

An image correcting method according to a seventh aspect of the present invention is constructed to comprise the steps of: effecting first reading for an image recorded on a recording material; obtaining image characteristic data based on a result of the reading; and storing, in storage means, the obtained image characteristic data together with information for specifying reading conditions in the first reading, and thereafter, when second reading is effected for an image recorded on the recording material, based on the information for specifying reading conditions in the first reading, which is acquired from the storage means, converting at least one of image data obtained by the second reading and the image characteristic data acquired from the storage means so that both data each becomes data equal to that obtained by reading an image under similar reading conditions, and thereafter, obtaining image characteristic data from the image data; based on both image characteristic data, calculating a correction parameter for correcting image quality deterioration of the image; and correcting the image data based on the calculated correction parameter.

In the seventh aspect, image characteristic data obtained by effecting first reading for an image recorded on a recording material is, together with information for specifying reading conditions, stored. Subsequently, when second reading for the image is effected, in order that image data obtained by the second reading and the image characteristic data obtained by the first reading are each made into data equal to that obtained by reading the image under similar reading conditions, at least one of both data is converted, and thereafter, image characteristic data is obtained from the image data. Based on both image characteristic data, a correction parameter is calculated so as to allow correction of the image data. Accordingly, in the same manner as in the second aspect, even when the reading conditions under which an image is read greatly differ from the reading conditions under which the image was formerly read, image quality deterioration of an image caused by storage environmental conditions or aged deterioration of the recording material can be corrected precisely.

BRIEF DESCRIPTION OF THE DRAWINGS

FIG. 4 is a perspective view which shows an example of a cartridge in which an IC memory chip is embedded.

FIG. 7A is an image diagram of image characteristic data at the time of first image output processing, FIG. 7B is an image diagram of spectral sensitivity characteristics of a scanner at the time of first image output processing, FIG. 7C is an image diagram of image data obtained after deterioration of image quality, FIG. 7D is an image diagram of spectral sensitivity characteristics of a scanner used after deterioration of image quality, FIG. 7E is an image diagram of image characteristic data obtained from the image data shown in FIG. 7C, FIG. 7F is an image diagram of a correction parameter obtained for each block, and FIG. 7G is an image diagram of a correction parameter obtained for each pixel.

FIGS. 8A and 8B are flow charts which show another example of calculation processing of an amount of correction for image quality deterioration.

FIGS. 9A and 9B are flow charts which show still another example of calculation processing of an amount of correction for image quality deterioration.

DESCRIPTION OF THE PREFERRED EMBODIMENTS

Referring now to the attached drawings, an example of an embodiment of the present invention will be described hereinafter in detail. First, a digital laboratory system according to the embodiment of the present invention will be described. The digital laboratory system is structured to include an image processing apparatus according to the present invention.

Figure 1:
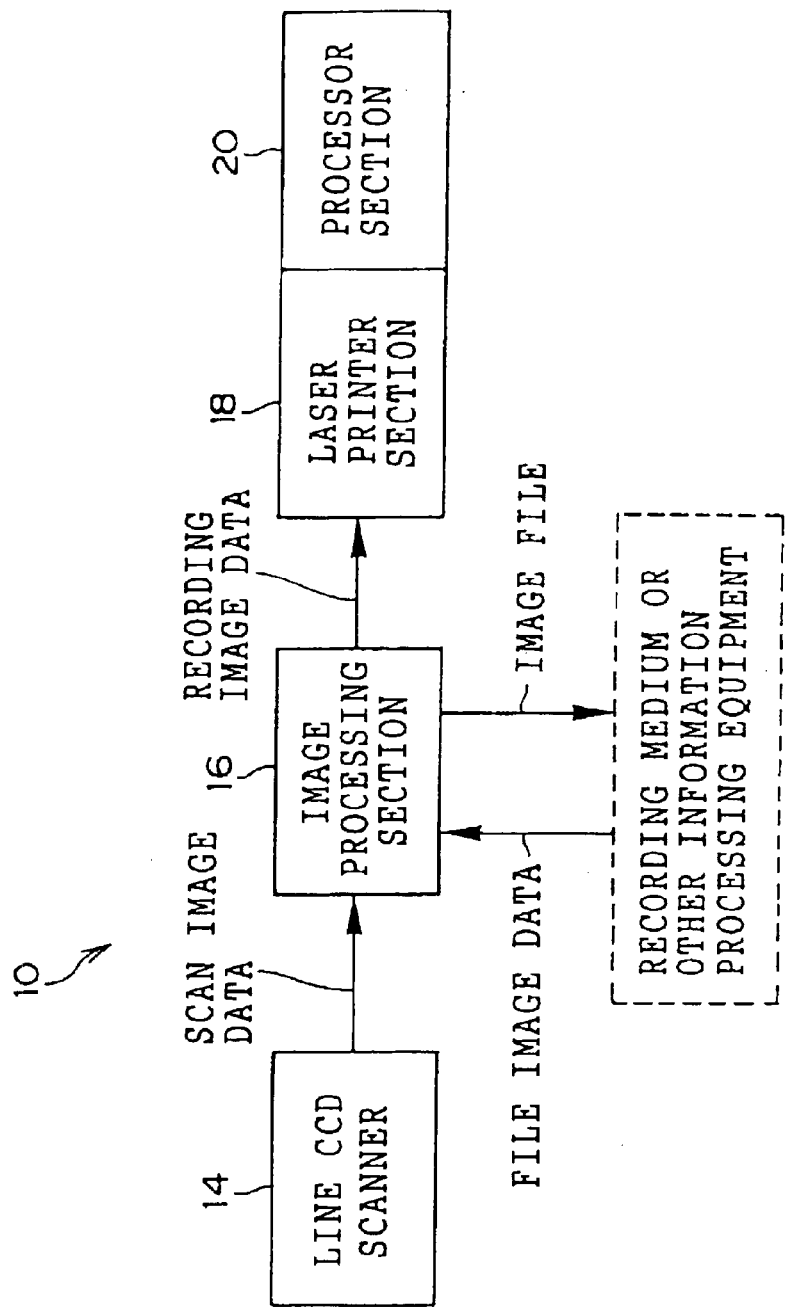
FIG. 1 is a schematic block diagram of a digital laboratory system according to an embodiment of the present invention.
Figure 2:
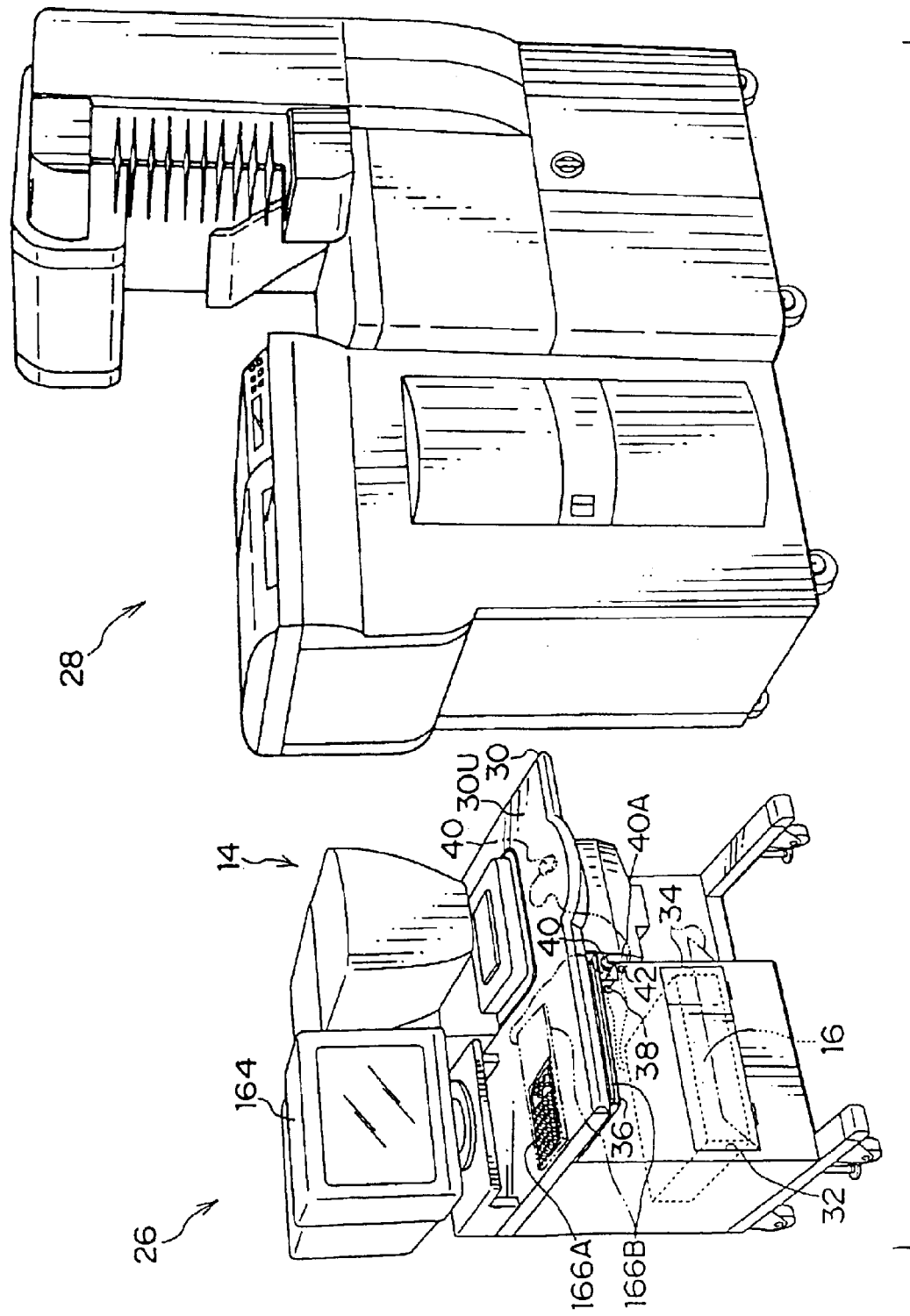
FIG. 2 is a perspective view which shows an outside of the digital laboratory system.

Schematic Structure of an Entire System:

FIG. 1 schematically shows the structure of a digital laboratory system 10 according to the present embodiment. FIG. 2 shows an outside of the digital laboratory system 10. As shown in FIG. 1, the digital laboratory system 10 is structured to include a line CCD scanner 14, an image processing section 16, a laser printer section 18, and a processor section 20. The line CCD scanner 14 and the image processing section 16 are integrated to form an input section 26 shown in FIG. 2, and the laser printer section 18 and the processor section 20 are integrated to form an output section 28 shown in FIG. 2. Further, the line CCD scanner 14 and the image processing section 16 correspond to an image processing apparatus according to the present invention. Particularly, the line CCD scanner 14 corresponds to reading means of the present invention.

The line CCD scanner 14 is used to read film images (that is, negative images or positive images, which are made visible by development processing after photographing of a subject) recorded on a photographic photosensitive material (hereinafter referred to simply as a photographic film) such as a photographic film (for example, a negative film or a reversal film). Examples of the photographic film on which film images to be read are recorded include a photographic film in 135 magazines, a photographic film in 110 magazines, a photographic film with a transparent magnetic layer formed thereon (i.e., a photographic film in 240 magazines: a so-called APS film), and photographic films in 120 magazines and 220 magazines (Brownie size). The line CCD scanner 14 reads the above-described film images to be read by a three-line color CCD and outputs image data of R, G, and B.

As shown in FIG. 2, the line CCD scanner 14 is mounted on an operation table 30. The image processing section 16 is accommodated in an accommodating portion 32 formed at a lower side of the operation table 30 and a door 34 is mounted at an opening portion of the accommodating portion 32. The interior of the accommodating portion 32 is usually concealed by the door 34. When the door 34 is opened, the interior of the accommodating portion 32 is exposed to view and the image processing section 16 can be taken out.

A display 164 is mounted onto the operation table 30 at a back side of the table and two kinds of keyboards 166A and 166B are provided on the operation table 30. One of the keyboards, the keyboard 166A, is embedded in the operation table 30. Another keyboard 166B is accommodated in a drawer 36 of the operation table 30 when not in use. When using the keyboard 166B, it is taken out of the drawer 36 and placed over the keyboard 166A. At the time of using the keyboard 166B, by causing a connector (not shown) mounted at an end of a cord (a signal wire) extending from the keyboard 166B to be joined to a jack 37 provided in the operation table 30, the keyboard 166B is electrically connected to the image processing section 16 via the jack 37.

A mouse 40 is disposed on an operation surface 30U of the operation table 30. The mouse 40 is joined to the image processing section 16 in such a manner that a cord (signal wire) thereof extends into the accommodating portion 32 via a through hole 42 formed in the operation table 30. The mouse 40 is accommodated in a mouse holder 40A when not in use. When using the mouse 40, it is taken out of the mouse holder 40A and placed on the operation surface 30U.

The image processing section 16 is structured to input image data (scan data) outputted from the line CCD scanner 14 and further input image data obtained by photographing using a digital camera, image data obtained by reading a film image or other original (for example, a reflection original) by a scanner, image data generated by a computer, and the like (these image data will be generically referred to as file image data) from outside (for example, via an information storage medium such as a memory card, a CD-R, or a floppy disk, or from other information processing equipment via a communication line).

The image processing section 16 performs image processing including various corrections for inputted image data and outputs the image data, as recording image data, to the laser printer section 18. The image processing section 16 is also allowed to output, as an image file, the image data subjected to the image processing to the outside (for example, to output the image data to an information storage medium such as a memory card or a CD-R, or transmit the image data to other information processing equipment via a communication line).

The laser printer section 18 includes laser light sources of R, G, and B and applies laser light modulated in correspondence with the recording image data inputted from the image processing section 16 onto a photographic printing paper, and records an image on the photographic printing paper by scan exposure. Further, the processor section 20 performs various processings including color development, bleach-fix, washing, and drying for the photographic printing paper on which images are recorded by scan exposure in the laser printer section 18. As a result, images are formed on the photographic printing paper.

Figure 3:
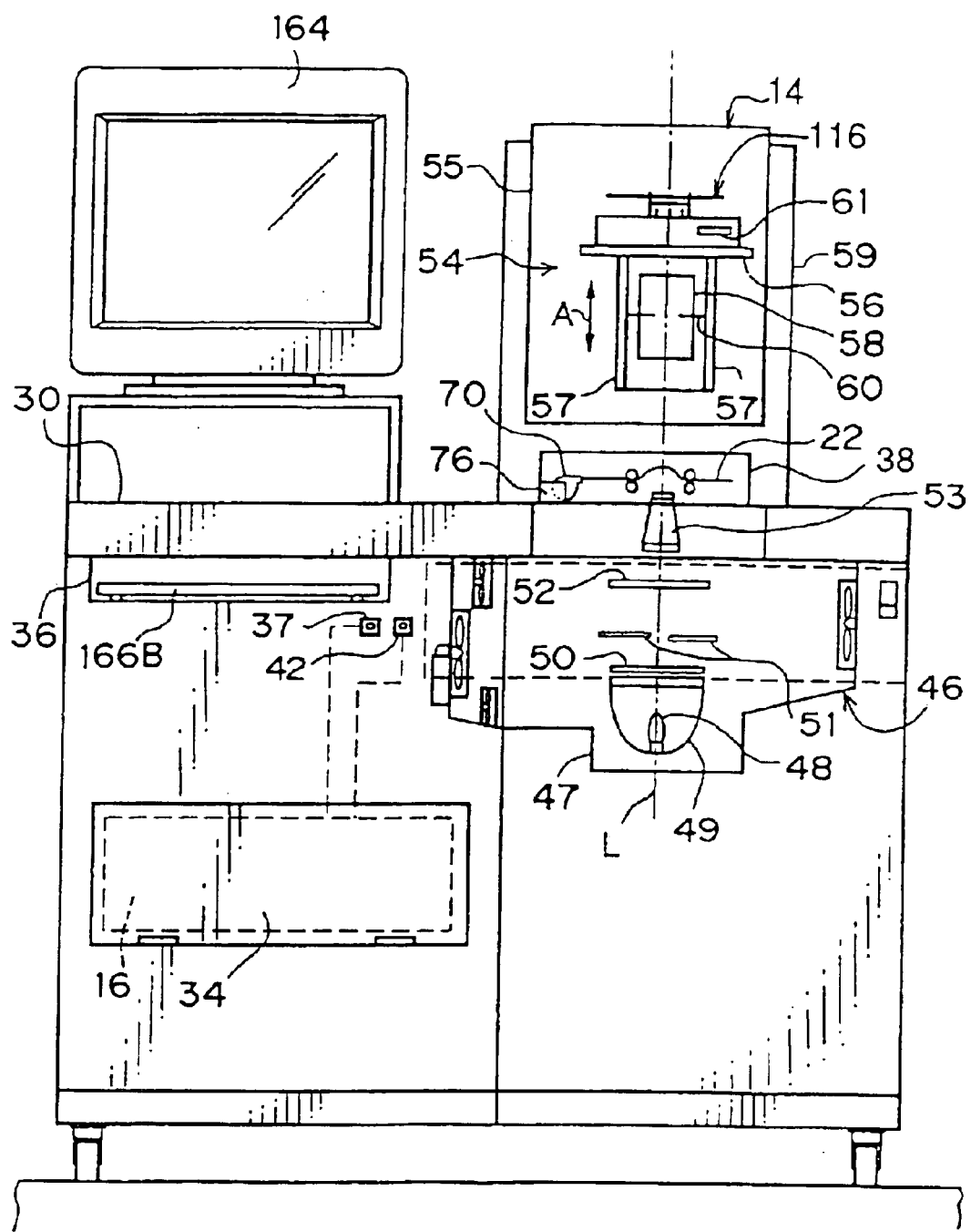
FIG. 3 is a schematic structural diagram of an optical system of a line CCD scanner.

Structure of Line CCD Scanner:

As shown in FIG. 3, an optical system of the line CCD scanner 14 includes a light source portion 46 disposed below the operation table 30, a diffusion box 53 supported by the operation table 30, a film carrier 38 set on the operation table 30 and conveying the photographic film 22 to be read, and a reading portion 54 disposed at the side of the operation table 30 opposite to the side at which the light source portion 46 is disposed.

The light source portion 46 is accommodated in a casing 47 made of metal. A lamp 48 comprised of a halogen lamp or the like is disposed within the casing 47. A reflector 49 is provided at a periphery of the lamp 48, and a part of light emitted from the lamp 48 is reflected by the reflector 49 and is reflected off in a fixed direction. A UV/IR cutting filter 50, a diaphragm 51, and a turret 52 are arranged along an optical axis L of light emitted from the reflector 49 in that order at a light emission side of the reflector 49. The turret 52 includes a negative-film balance filter and a positive-film balance filter, which are embedded in the turret. By selectively positioning these balance filters on the optical axis L, color components of light emitted from the light source portion 46 can be properly adjusted in accordance with the kind of photographic film to be read (that is, a negative film or a positive film).

The diffusion box 53 is formed in such a manner that a dimension of the diffusion box 53 along a direction in which the photographic film 22 is conveyed decreases gradually toward a top portion thereof (that is, in a direction nearing the photographic film 22) and a dimension of the diffusion box 53 along a direction perpendicular to the direction in which the photographic film 22 is conveyed increases gradually (which are not illustrated). A light diffusion plate (not shown) is mounted at each of a light incident side and a light exit side of the diffusion box 53. Light made incident on the diffusion box 53 is directed to the film carrier 38 (that is, the photographic film 22) and is made into slit light whose longitudinal direction coincides with a transverse direction of the photographic film 22. Further, the incident light is made into diffused light by a light diffusion plate and is emitted. The diffusion box 53 is, in the same way as the film carrier 38, provided for every kind of the photographic film 22 to be read and is selected in accordance with the kind of the photographic film 22 to be read.

A slit-like opening (not shown) whose longitudinal dimension is larger than the transverse dimension of the photographic film 22 is formed at a position on the film carrier 38, which corresponds to the optical axis L. Slit light emitted from the diffusion box 53 is irradiated on the photographic film 22 to be read, which is set in the film carrier 38, and the light transmitted through the photographic film 22 reaches the reading portion 54. Further, the film carrier 38 includes a guide (not shown) for guiding the photographic film 22 so that the photographic film 22 is curved at a position at which slit light from the diffusion box 53 is irradiated (that is, a reading position). As a result, flatness of the photographic film 22 at the reading position is maintained.

Further, the photographic film 22 is set in the film carrier 38 in a state of being accommodated within a cartridge 70 shown in FIG. 4. A memory IC chip 72 serving as storage means is embedded in the cartridge 70. The memory IC chip 72 (hereinafter referred to as a cartridge IC memory 72) is comprised of a nonvolatile IC memory such as EEPROM. A plurality of rectangular holes (for example, in FIG. 4, six holes) are formed on one side surface of the cartridge 70 and a plurality of terminals 74 are provided so as to respectively correspond to the rectangular holes. Each terminal 74 is exposed to the outside via the rectangular hole and is electrically connected to the cartridge IC memory 72.

The film carrier 38 is provided with an IC read/write device 76 corresponding to the terminals 74 of the cartridge 70 (see FIG. 3). The IC read/write device 76 is provided with a plurality of metallic pins (not shown) corresponding to the terminals 74. The metallic pins are provided so as to respectively contact the terminals 74 of the cartridge 70 with the cartridge 70 being set in the film carrier 38. Accordingly, when the cartridge 70 is set in the film carrier 38, the IC read/write device 76 and the cartridge IC memory 72 are electrically connected via the pins and the terminals 74 so as to allow reading of information from the cartridge IC memory 72 and writing of information in the cartridge IC memory 72. The IC read/write device 76 corresponds to acquisition means of the present invention.

On the other hand, the reading portion 54 is accommodated within the casing 55. Within the casing 55, a mounting stand 56 to which a line CCD 116 is mounted is provided and a lens barrel 57 extends downward from the mounting stand 56. A lens unit 58 is supported by the lens barrel 57 in such a manner as to move slidably in directions indicated by double-headed arrow A in which it moves toward and apart from the operation table 30. A supporting frame 59 is provided upright on the operation table 30. The mounting stand 56 is supported by a guide rail (not shown) mounted on the supporting frame 59 in such a manner as to be slidable in directions in which it moves toward and apart from the operation table 30. The lens unit 58 is comprised of a plurality of lenses and a lens diaphragm 60 is provided among the plurality of lenses.

A CCD shutter 61 is provided at the side of the line CCD 116 where light is made incident. An ND filter (not shown) is fitted in the CCD shutter 61. The CCD shutter 61 is provided to be changed to any one of the following states: a completely closed state which causes shading of light made incident on the line CCD 116; a full open state which allows light to be made incident on the line CCD 116; and a reduced light state in which light made incident on the line CCD 116 is reduced by the ND filter.

In the line CCD 116, three sensing portions each including a large number of photoelectric transfer elements such as CCD cells and photodiodes, which are arranged in a row along the transverse direction of the photographic film 22, and further including an electronic shutter mechanism are provided in parallel at intervals to form three lines and color separation filters of R, G, and B are respectively mounted at light incident sides of the three sensing portions (a so-called three-line color CCD). A transfer portion comprised of a large number of CCD cells is provided in the vicinity of each sensing portion so as to correspond to the sensing portion. Electric charge accumulated in each of CCD cells in each sensing portion is sequentially transmitted outside via the corresponding transfer portion.

On the other hand, an amplifier, an A/D converter, and a correlative double sampling circuit (CDS), which are all not shown, are sequentially connected to a signal output end of the line CCD 116. A signal outputted from the line CCD 116 is amplified in the amplifier and converted by the A/D converter to digital data, and further subjected to correlative double sampling for subtracting feed-through data from pixel data for each pixel, and thereafter, the processed signal is sequentially outputted, as scan data, to the image processing section 16.

Figure 5:
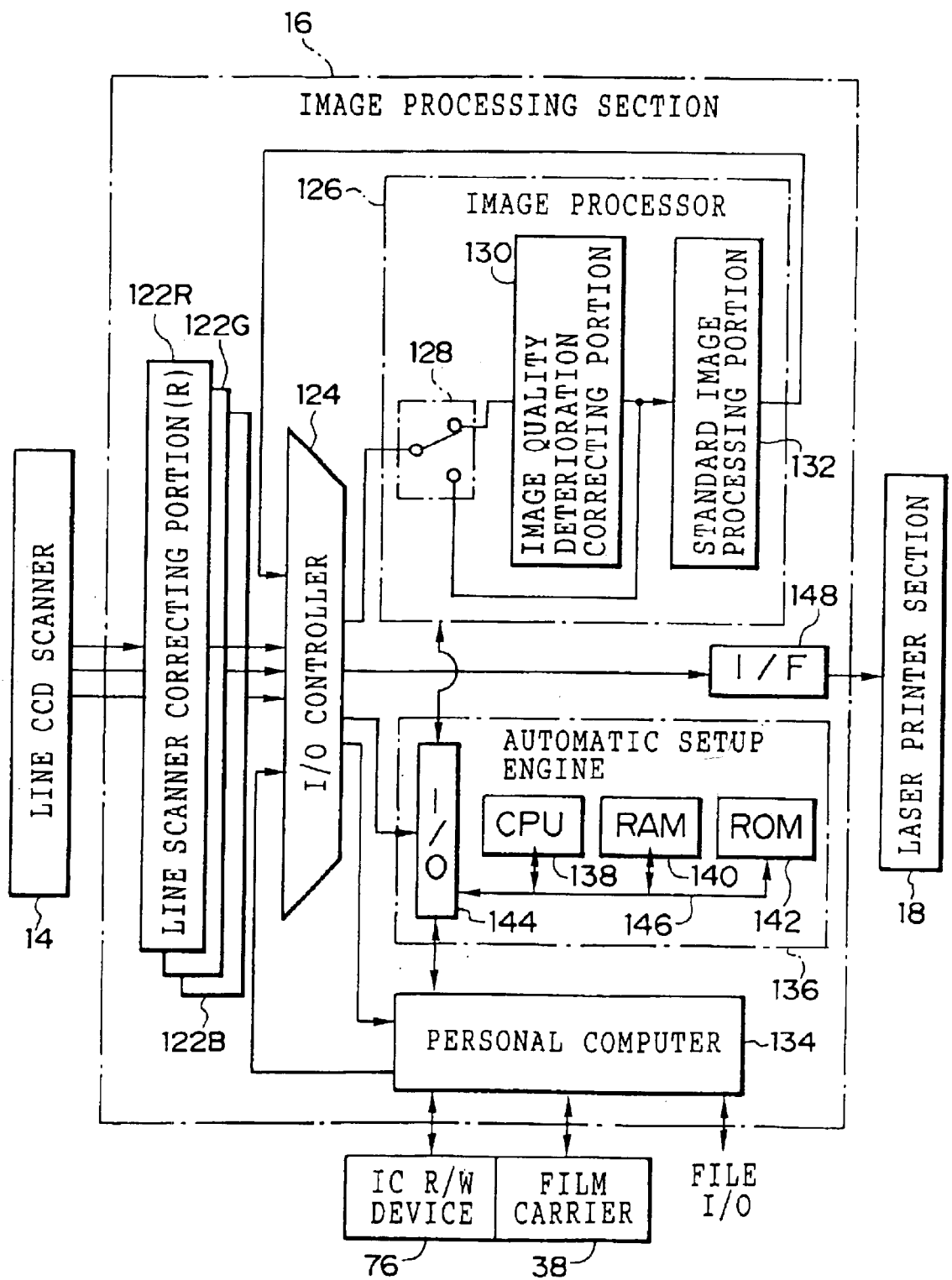
FIG. 5 is a block diagram which schematically shows a structure of an image processing section.

Structure of Image Processing Section:

Next, the structure of the image processing section 16 will be described with reference to FIG. 5. The image processing section 16 includes line scanner correcting portions 122R, 122G, and 122B in correspondence with data of R, G, and B inputted from the line CCD scanner 14. The line scanner correcting portions 122R, 122G, and 122B have the same structures and are referred to generically as "line scanner correcting portion 122".

When scan data is inputted from the line CCD scanner 14 to the line scanner correcting portion 122, the line scanner correcting portion 122 sequentially carries out respective processings of dark correction which subtracts a dark output level of a corresponding cell from the inputted scan data for each pixel, density conversion which allows logarithmic conversion of data subjected to the dark correction to data which represents density of a photographic film, shading correction which corrects, in pixel unit, data subjected to the density conversion in accordance with ununiformity of an amount of light illuminated on the photographic film, and defective-pixel correction which, among data subjected to the shading correction, interpolates data of a cell (a so-called defective pixel), from which a signal properly corresponding to an amount of incident light is outputted, from data of peripheral pixels so as to allow formation of new data.

An output end of the line scanner correcting portion 122 is connected to an input end of the I/O controller 124, and data having been subjected to the above-described processings in the line scanner correcting portion 122 is inputted, as scan data, to the I/O controller 124. Further, an input end of the I/O controller 124 is also connected to a data output end of an image processor 126 and image data having been subjected to image processing (described later in detail) is inputted from the image processor 126 to the I/O controller 124.

An input end of the I/O controller 124 is also connected to a personal computer 134. The personal computer 134 includes an extension slot (not shown). A driver (not shown) which effects reading and writing of data from and in an information storage medium such as a memory card or a CD-R, or a communication control device which allows communication with other information processing equipment is connected to the extension slot. When file image data is inputted from the outside via the extension slot, the inputted file image data is inputted to the I/O controller 124.

An output end of the I/O controller 124 is connected to a data input end of the image processor 126, an automatic setup engine 136, and the personal computer 134, respectively, and is further connected to the laser printer section 18 via an I/F circuit 148. The I/O controller 124 selectively outputs the inputted image data to the above-described devices connected to the output end of the I/O controller 124.

In the present embodiment, two reading operations for each of film images recorded on the photographic film 22 are carried out in the line CCD scanner 14 at different resolutions. In the first reading operation at a relatively low resolution (hereinafter referred to as pre-scan), even when the density of a film image is very low (for example, even in a case of an underexposed negative image in a negative film), an entire surface of the photographic film is read under reading conditions determined so as not to allow occurrence of saturation of accumulated charge in the line CCD (that is, amounts of light for respective wavelengths of R, G, and B of light irradiated on the photographic film, a charge accumulation time in the line CCD, and the like). Data obtained by the pre-scan (that is, pre-scan data) is inputted from the I/O controller 124 to the automatic setup engine 136.

The automatic setup engine 136 includes a CPU 138, a RAM 140 (for example, DRAM), a ROM 142 (for example, a ROM which allows rewriting of stored contents), and an input/output port 144, which are connected together via a bus 146. The automatic setup engine 136 determines, based on pre-scan data inputted from the I/O controller 124, a frame position of a film image, and extracts data (pre-scan image data) corresponding to a region on the photographic film with a film image being recorded thereon. Further, based on the pre-scan image data, the size of a film image is determined and an image characteristic amount such as density is calculated, and reading conditions when a second reading operation is carried out by the line CCD scanner 14 at a relatively high resolution (hereinafter referred to as fine scan) is determined for a photographic film subjected to pre-scan. Then, the frame position and reading conditions are outputted to the line CCD scanner 14.

Further, the automatic setup engine 136 automatically determines, based on pre-scan image data of film images for a plurality of frames, processing conditions of various image processings for image data obtained by the line CCD scanner 14 carrying out fine scan (that is, fine scan image data) by calculation (setup calculation), and outputs the determined processing conditions to the image processor 126. The determination of the processing conditions of the image processings is made by a determination as to whether a plurality of film images having similar scenes being photographed exist from an amount of exposure at the time of photographing, a kind of a light source for photographing, or other characteristic amounts. When the plurality of film images having similar scenes being photographed exists, the processing conditions of the image processings for these film images are determined so as to be identical to or approximate to one another.

Optimum processing conditions of the image processings vary depending on an output mode in which image data after image processing is used for recording an image on a photographic printing paper in the laser printer section 18 or is stored in an information storage medium. Accordingly, the image processing section 16 carries out setup calculation corresponding to the output mode of an image and obtains the optimum processing conditions corresponding to the output mode of an image.

Further, the automatic setup engine 136 is connected to the personal computer 134. When scan data inputted from the line CCD scanner 14 is processed, information stored in the cartridge IC memory 72 of the cartridge 70 set in the film carrier 38 is fetched via the personal computer 134. Subsequently, based on the fetched information and the pre-scan image data, it is determined whether when a relatively long period of time has elapsed after previous image output processing for a film image to be processed, which is recorded on the photographic film 22, image quality deterioration is caused in a film image under the influence of storage environmental conditions or aged deterioration of the photographic film. When it is determined that deterioration of image quality is caused in the film image, correction parameters for correcting image quality deterioration are calculated and the calculated parameters are transmitted to the image processor 126.

Connected to the personal computer 134 are the display 164 shown in FIG. 2, the keyboard 166 (corresponding to the keyboard 166A and the keyboard 166B which are shown in FIG. 2), and the mouse 40. The personal computer 134 fetches pre-scan image data extracted from pre-scan data by the automatic setup engine 136 and further fetches the processing conditions of the image processings determined by the automatic setup engine 136, and based on the fetched processing conditions, carries out image processing, which is equivalent to that carried out in the image processor 126 for fine scan image data, for pre-scan image data to thereby generate simulation image data.

Subsequently, the generated simulation image data is converted to a signal for displaying an image on the display 164, and based on the signal, a simulation image is displayed on the display 164. Further, inspection of image quality for the simulation image displayed on the display 164 is carried out by an operator, and when information which indicates, as an inspection result, correction of the processing conditions is inputted via the keyboard 166, the information is outputted to the automatic setup engine 136. As a result, in the automatic setup engine 136, processing such as recalculation of the processing conditions of image processings is carried out.

Connected also to the personal computer 134 are the film carrier 38 and the IC read/write device 76 (which is mentioned as "IC R/W DEVICE" in FIG. 5), and conveying of the photographic film by the film carrier 38 is controlled, and reading and writing of information from and in the cartridge IC memory 72 of the cartridge 70 set in the film carrier 38 is also controlled. Further, when an APS film is set in the film carrier 38, the film carrier 38 controls reading and writing of information from and in a magnetic layer of the APS film.

On the other hand, image data (fine scan image data) inputted to the I/O controller 124 by carrying out fine scan for a film image in the line CCD scanner 14 is inputted from the I/O controller 124 to the image processor 126.

The image processor 126 includes a switching portion 128, an image quality deterioration correcting portion 130, and a standard image processing portion 132. The switching portion 128 is comprised of a switching element and the like, and in accordance with the processing conditions transmitted from the automatic setup engine 136, the switching portion 128 can be switched to a first state in which inputted image data is outputted to the image quality deterioration correcting portion 130, or to a second state in which inputted image data is outputted to the standard image processing portion 132 (that is, the image data is outputted to the standard image processing portion 132 without being processed in the image quality deterioration correcting portion 130).

When it is determined that image quality deterioration is caused in a film image to be processed under the influence of storage environmental conditions or aged deterioration of a photographic film, the automatic setup engine 136 switches the switching portion 128 to the first state to thereby caused image data inputted from the I/O controller 124 to be inputted to the image quality deterioration correcting portion 130. The image quality deterioration correcting portion 130 effects image quality correction processing for correcting image quality deterioration caused by storage environmental conditions or aged deterioration of a photographic film in accordance with the correction parameter transmitted from the automatic setup engine 136. The image quality deterioration correcting portion 130 corresponds to correction means of the present invention.

The standard image processing portion 132 carries out various image processings for the inputted image data in accordance with the processing conditions transmitted from the automatic setup engine 136 for each image. The image data subjected to various image processings in the standard image processing portion 132 is outputted to the I/O controller 124 as described above. Meanwhile, the image processings carried out in the standard image processing portion 132 includes image processing for improvement in image quality of an output image, for example, gradation conversion, color conversion, hypertone processing for compressing gradation of ultra-low frequency luminance components of an image, hypersharpness processing for highlighting sharpness while inhibiting graininess, and the like.

The image processing portion 132 may be structured to be also able to effect nonstandard image processing to be selectively effected for each image (or each group comprised of a plurality of images recorded on one photographic film), which nonstandard image processing includes image processing for intentionally altering image tone (for example, image processing for finishing an output image in a monotone, image processing for finishing an output image in a portrait tone, and image processing for finishing an output image in a sepia tone), image processing for processing an image (for example, image processing for finishing a human being in an original image in the form of a thin figure), and the like. Further, the image processing portion 132 may also carry out various correction processings for aberration of a lens-fitted film package (LF) for correcting image quality deterioration in an output image, which is caused by lens characteristics of the lens-fitted film package, for an image photographed by the lens-fitted film package, which various correction processings include limb darkening correction processing for correcting distortion aberration of a lens of the lens-fitted film package, geometric distortion of an image caused by transverse chromatic aberration, and color displacement, limb darkening correction processing for correcting decrease in lightness of a peripheral edge of an image, which is caused by limb darkening of a lens of the lens-fitted film package, out-of-focus correction processing for correction decrease in sharpness of an image, which is caused by lens characteristics of the lens-fitted film package, and the like.

When image data subjected to image processing in the image processor 126 is used for recording an image on a photographic printing paper, the image data subjected to image processing in the image processor 126 is outputted, as recording image data, from the I/O controller 124 to the laser printer section 18 via the I/F circuit 148. As a result, an image is recorded on a photographic printing paper in the laser printer section 18.

When the image data after image processing is outputted, as an image file, to the outside, the image data subjected to image processing in the image processor 126 is outputted from the I/O controller 124 to the personal computer 134. As a result, in the personal computer 134, image data to be outputted to an outside, which has been inputted from the I/O controller 124, is outputted, as an image file, to the outside (to the driver or to the communication control device) via an extension slot.

Operation:

Next, as operation of the present embodiment, calculation processing of an amount of correction for image quality deterioration, which is executed by the CPU 138 of the automatic setup engine 136, will be described with reference to flow charts shown in FIGS. 6A and 6B. The calculation processing of an amount of correction for image quality deterioration is executed for each of film images recorded on the photographic film 22 after pre-scan for film images recorded on the photographic film 22 in the line CCD scanner 14, determination of a frame position of each film image for pre-scan data inputted from the line CCD scanner 14 in the automatic setup engine 136, and processing such as sectioning of pre-scan image data, and the like.

When reading of the photographic film 22 is carried out by the line CCD scanner 14, the IC read/write device 76 carries out reading of information from the cartridge IC memory 72 of the cartridge 70 set in the film carrier 38 concurrently with the pre-scan for the photographic film 22 in the line CCD scanner 14. In step 200, the information read out from the cartridge IC memory 72 by the IC read/write device 76 is fetched via the personal computer 134.

In step 202, it is determined whether, based on the information fetched in step 200, image output processing carried out at present (that is, processing such as recording of an image on a photographic printing paper, or storage of image data in an information storage medium) is the first image output processing for film images recorded on the photographic film 22 set in the film carrier 38. When the image output processing was carried out in the past, predetermined information is written in the cartridge IC memory 72 during the past image output processing (which will be described later in detail). Accordingly, the above-described determination can be made by determining whether the information fetched in step 200 includes the predetermined information.

When the decision of step 202 is made affirmative, it can be determined that reading of a film image accompanied with the present image output processing is first reading processing for a film image recorded on the photographic film 22 set in the film carrier 38. Therefore, the process proceeds to step 204, in which pre-scan image data of a film image to be processed is, for example, divided into a predetermined number of blocks as shown in FIG. 7A, and based on image data for each block, respective average densities of R, G, and B ($R_i$, $G_i$, and $B_i$, "i" is a code for identifying each block) in each block are calculated as image characteristic data of each block. The image characteristic data corresponds to "data which indicates a predetermined image characteristic amount of each block" described in the fifth aspect of the present invention.

The image characteristic data according to the present embodiment is data which indicates respective average densities of R, G, and B of each block, and therefore, the quantity of data is small and a small storage capacity suffices for storage of image characteristic data. Further, the respective average densities R, G, and B of each block are image characteristic amounts which change correspondingly to variation of low-frequency components in a spatial frequency spectrum of an image. Accordingly, when image quality deterioration in an image is caused by storage environmental conditions or aged deterioration of the photographic film 22, values of image characteristic data also change.

Further, the first image output processing for a film image is, usually, requested at the same time as that of making a request for processing of the photographic film 22 after completion of photographing and recording of an image by a camera or the like for the photographic film 22. Therefore, when the decision of step 202 is made affirmative, it can be determined that image quality deterioration caused by storage environmental conditions or aged deterioration of the photographic film 22 does not occur. Accordingly, the image characteristic data obtained in step 204 more specifically represents image quality of a film image prior to the deterioration in image quality caused under the influence of storage environmental conditions or aged deterioration of the photographic film 22.

In step 206, as the reading conditions by the line CCD scanner 14, information which represents spectral sensitivity characteristics (for example, see FIG. 7B) of the line CCD scanner 14 (line CCD 116), and information which represents a reading position of a film image are fetched. The information which represents the reading position includes information which represents one of the front and back surfaces of the photographic film 22 read by the line CCD scanner 14 (that is, a reading surface), information which represents a direction in which a film image is read by the line CCD scanner 14 (that is, one of forward and backward directions in which the photographic film 22 is conveyed in a reciprocating manner), information which represents an image region of a film image along longitudinal and transverse directions of the photographic film 22 (that is, a main scan direction and a sub-scan direction in the reading by the line CCD scanner 14), and the like.

In the subsequent step 208, the image characteristic data obtained by the calculation in step 204, the data which indicates the reading conditions fetched in step 206, and respective information of divided blocks obtained by the division into blocks in step 204 are written, as information relating to a film image to be processed, in the cartridge IC memory 72 via the IC read/write device 76. At this time, information indicating the fact that first image output processing for a film image has been carried out is also written. After the process of the above-described step 208, the calculation processing of an amount of correction for image quality deterioration ends.

The above-described steps 204 to 208 correspond to the step of reading an image, obtaining image characteristic data, and storing the image characteristic data in storage means, which is provided in the sixth and seventh aspects of the present invention. During the first image output processing for a film image, the process of steps 204 to 208 is executed for each film image recorded on the photographic film 22. Information such as the spectral sensitivity characteristics of the line CCD scanner 14, or the number of divided blocks, is information which is common to film images of one photographic film 22, and therefore, it is preferable that film images are stored in the cartridge IC memory 72 for each film without being respectively stored in the cartridge IC memory 72. Further, even when a scanner used during the first image output processing for film images is different from the line CCD scanner 14, the aforementioned used scanner or other device is used to store the same information as that described in steps 204 to 208 in the cartridge IC memory 72 in the same format.

When the decision of step 202 is made affirmative, it can be determined that image quality deterioration is not caused in a film image to be processed. For this reason, fine scan is carried out for each film image in the line CCD scanner 14, and when image processing is carried out for fine scan image data inputted from the line CCD scanner 14 in the image processor 126, the automatic setup engine 136 switches the switching portion 138 to the second state and predetermined image processing is carried out for the fine scan image data only in the standard image processing portion 132 without image quality correction processing for the fine scan image data being carried out in the image quality deterioration correcting portion 130.

On the other hand, when the photographic film 22 set in the film carrier 38 is a photographic film in which image output processing has been previously carried out for a film image, reading of the film image is also effected by a scanner during the image output processing and it can be determined that various information is stored in the cartridge IC memory 72. For this reason, when the decision of step 202 is made negative, the process proceeds to step 210, in which information indicating the spectral sensitivity characteristics of the line CCD scanner 14 and information indicating the reading position of a film image (that is, reading surface, reading direction, an image region, or the like) are fetched as the reading conditions of the line CCD scanner 14.

In this case, in the previous step 200, together with the information indicating the fact that the image output processing was carried out in the past, the information which indicates the spectral sensitivity characteristics of a scanner used for the reading a film image during the first image output, the information which indicates the reading position of a film image during the first image output, the number of divided blocks during the first image output, and respective image characteristic data ($R_i$, $G_i$, $B_i$) of R, G, and B for each block is read out from the cartridge IC memory 72. Step 210 and subsequent steps correspond, together with step 200, to calculation means of the present invention (more specifically, calculation means of the second aspect of the present invention).

In step 212, the information which indicates the spectral sensitivity characteristics of the line CCD scanner 14 fetched in step 210 is compared with the information which indicates the spectral sensitivity characteristics read out from the cartridge IC memory 72 (that is, the information which indicates the spectral sensitivity characteristics of the scanner used for the reading of a film image during the first image output), and it is thereby determined whether the respective spectral sensitivity characteristics do or do not coincide with each other. When the reading of a film image is carried out by the line CCD scanner 14 or a scanner of the same kind as the line CCD scanner 14 during the first image output, the spectral sensitivity characteristics of the line CCD scanner 14 coincide with the spectral sensitivity characteristics read out from the cartridge IC memory 72. As a result, the decision of step 212 is made affirmative. i.e. the spectral characteristics do coincide and the process proceeds to step 218.

However, when the kind of the scanner used during the first image output is different from that of the line CCD scanner 14, for example, as shown in FIG. 7D, there are many cases in which respective spectral sensitivity characteristics of these scanners differ from each other. In FIG. 7D, the spectral sensitivity characteristics of the line CCD scanner 14 are indicated by dotted lines and the spectral sensitivity characteristics of the scanner used during the first image output are indicated by solid lines. When the decision of step 212 is made negative, the process proceeds to step 214, in which based on the spectral sensitivity characteristics of the line CCD scanner 14 and the spectral sensitivity characteristics of the scanner used during the first image output, a spectral sensitivity conversion factor for correcting the difference of spectral sensitivity characteristic (that is, for converting image data, obtained by the reading using the line CCD scanner 14, to image data equal to that obtained by reading using a scanner whose spectral sensitivity characteristics are the same as those of the scanner used during the first image output) is calculated and is stored in the RAM 140 or the like.

In the subsequent step 216, based on the spectral sensitivity conversion factor obtained in step 214, image data obtained by the reading using the line CCD scanner 14 (that is, pre-scan image data, which is, for example, shown in FIG. 7C) is corrected. As a result, the image data is converted to image data equal to that obtained by the reading using a scanner whose spectral sensitivity characteristics are the same as those of the scanner used during the first image output.

In step 218, the information indicating the reading position provided by the line CCD scanner 14, which is fetched in step 210, is compared with the information which indicates the reading position among the information read out from the cartridge IC memory 72 in step 200 and the image data is converted so that the former reading position coincides with the reading position (reading surface, reading direction, and image region) during the first image output. For example, when at least one of the reading surface and the reading direction does not coincide with that during the first image output, arrangement of image data is changed in, pixel unit (that is, up-and-down reversal or right-and-left reversal) so that image data becomes equal to that obtained by performing reading an image on the same reading surface and in the same reading direction as those of the first image output. Further, for example, when the image region does not coincide with that during the first image output, in accordance with the image region during the first image output, a cut-out position of pre-scan image data from pre-scan data is corrected and image data is cut out again, or processing such as cancellation of unnecessary data corresponding to an end portion of an image is carried out. As a result, image data is obtained which is equal to that obtained by reading the same reading position on the photographic film 22 as the reading position during the first image output.

As described above, the correction for causing the reading position to coincide with that during the first image output is also reflected on fine scan, and for example, when respective image regions do not coincide with each other, the reading position during the fine scan is corrected so that the same reading position on the photographic film 22 as the reading position during the first image output is read during the fine scan. Further, when at least one of the reading surface and the reading direction does not coincide with that during the first image output, arrangement of fine scan image data is changed by the image quality deterioration correcting portion 130 in pixel unit so that fine scan image data obtained by the fine scan becomes equal to image data obtained by carrying out the reading on the same reading surface or in the same reading direction as that during the first image output.

In step 220, based on the information which indicates the number of divided blocks among the information read out from the cartridge IC memory 72 in step 200, the image data subjected to the process of steps 212 to 218 is, as shown in FIG. 7E, divided into the same number of blocks as in the first image output, and based on the image data for each block, average densities of R, G, and B ($r_i$, $g_i$, $b_i$) in each block are calculated as image characteristic data for each block. In step 222, the present image characteristic data calculated in step 220 (that is, data which indicates the present image quality) is compared with the image characteristic data during the first image output, which is read from the cartridge IC memory 72 in step 200, that is, data which indicates image quality during the first image output), and based on a determination as to whether, for each block, the difference between respective image characteristic data in both cases is a predetermined value or greater for each color, it is determined whether correction for image quality deterioration is required.

For example, when the difference between the present image characteristic data and the image characteristic data during the first image output is less than a predetermined value in all of blocks, it can be determined that the degree of image quality deterioration starting from the first image output is within an allowable range. Accordingly, the calculation processing of an amount of correction for image quality deterioration ends without carrying out any processing. In this case, when image processing is carried out for fine scan image data in the image processor 126, the automatic setup engine 136 switches the switching portion 138 to the second state and predetermined image processing is carried out for the fine scan image data only in the standard image processing portion 132 without the image quality correction processing being carried out in the image quality deterioration correcting portion 130.

On the other hand, when there is one block or a predetermined number of (that is, a plurality of) blocks, in which the difference between the present image characteristic data and the image characteristic data during the first image output is a predetermined value or greater, it is determined that the degree of image quality deterioration starting from the first image output exceeds the allowable range, and the process proceeds to step 224. In step 224, a correction parameter for correcting for image quality deterioration is calculated for each color in block unit from the difference between the present image characteristic data and the image characteristic data during the first image output.

For example, when the average densities of R, G, and B in each block are employed as the image characteristic data, a correction parameter of block i can be obtained in accordance with the following expressions on the basis of the present image characteristic data ($r_i$, $g_i$, $b_i$) and the image characteristic data ($R_i$, $G_i$, $B_i$) during the first image output (also see FIG. 7F).

$$\Delta r_i = R_i - r_i \quad \Delta g_i = G_i - g_i \quad \Delta b_i = B_i - b_i$$

In step 226, based on the correction parameter obtained for each block, a correction parameter for each pixel of image data (that is, fine scan image data to be subjected to correction of image quality) is set (for example, see FIG. 7G). The setting of the correction parameter can be realized by, for example, setting, for each of all blocks, the same correction parameter for all pixels within the same block.

Further, when there is a possibility that a finished state changes at a position corresponding to a border of blocks on an image in the image quality correction processing according to the correction parameter, the correction parameter for each of all pixels may be set by, for example, setting a weight for each block in which a central pixel is located within a mask having a predetermined shape (for example, a circular region whose radius is greater than or equal to the length of one side of the block) with the pixel to be processed set as the center so that the weight becomes smaller as the distance between the central pixel and the pixel to be processed is made longer and a total sum of weights thereby comes to 1, and calculating a weighted additional value of the correction parameter for each block, and further, setting the calculated result as the correction parameter of the pixel to be processed.

In the aforementioned correction parameter calculation method, although locality of correction (precision of correction to an image quality deterioration component, which varies depending on the position thereof on the image) decreases by increasing the size of the mask, continuity of finish of an image at locations corresponding to borders of blocks improves. Although the continuity of finish of an image decreases by reducing the size of the mask, the locality of correction improves. Accordingly, the size of the mask may be varied in accordance with the kind of a photographic film or time having elapsed from the time of the first image output.

In step 228, it is determined whether, in the same way as in step 212, the spectral sensitivity characteristics of the line CCD scanner 14 do coincide with the spectral sensitivity characteristics of the scanner used during the first image output. When the decision of step 228 is made affirmative, the calculation processing of an amount of correction for image quality deterioration ends without any operation being carried out. When the decision of step 228 is made negative, the process proceeds to step 230.

In step 230, based on the spectral sensitivity characteristics of the line CCD scanner 14, and the spectral sensitivity characteristics of the scanner used during the first image output, the correction (conversion) in step 216 and correction in an opposite direction (inverse conversion), that is, a spectral sensitivity inverse conversion factor for converting the image data obtained by reading using a scanner whose spectral sensitivity characteristics are the same as those of the scanner used during the first image output to image data equal to that obtained by reading using the scanner whose spectral sensitivity characteristics are the same as those of the line CCD scanner 14 is calculated and stored in the RAM 140 or the like. The calculation processing of an amount of correction for image quality deterioration ends. P In a case in which the correction parameters are calculated in steps 224 and 226 as described above, when image processing is carried out for the fine scan image data in the image processor 126, the automatic setup engine 136 switches the switching portion 138 to the first state and transfers the correction parameters calculated in step 226 to the image quality deterioration correcting portion 130. When the spectral sensitivity characteristics of the line CCD scanner 14 and the spectral sensitivity characteristics of the scanner used during the first image output do not coincide with each other (that is, when the decisions of steps 212 and 228 are each made negative), the spectral sensitivity conversion factor calculated and stored in step 214 and the spectral sensitivity inverse conversion factor calculated and stored in step 230 are transferred to the image quality deterioration correcting portion 130.

When the spectral sensitivity conversion factor and the spectral sensitivity inverse conversion factor are also transferred in addition to the correction parameters, the image quality deterioration correcting portion 130 first carries out, based on the spectral sensitivity conversion factor transferred from the automatic setup engine 136, conversion (spectral sensitivity conversion) of image data (fine scan image data) inputted from the I/O controller 124 via the switching portion 128, to image data obtained by the reading using a scanner whose spectral sensitivity characteristics are the same as those of the scanner used during the first image output.

Subsequently, the image quality deterioration correcting portion 130 effects correction of a density value for image data having been subjected to the spectral sensitivity conversion for each of data of R, G, and B of each pixel. An inverse conversion of spectral sensitivity is effected for the corrected image data on the basis of the spectral sensitivity inverse conversion factor transferred from the automatic setup engine 136. When only the correction parameters are transferred, the spectral sensitivity characteristics of the scanner used during the first image output and the spectral sensitivity characteristics of the line CCD scanner 14 are provided to be equal or substantially equal to each other. Accordingly, the image quality deterioration correcting portion 130 effects only correction based on the correction parameters without effecting the spectral sensitivity conversion and the spectral sensitivity inverse conversion. Due to the above-described processing, image data in which image quality deterioration caused under the influence of storage environmental conditions or aged deterioration of the photographic film 22 from the time of the first image output is corrected precisely is obtained.

According to the above-described processing, even when the scanner used during the first image output and the line CCD scanner 14 differ from each other in the reading conditions such as spectral sensitivity characteristics, it is possible to precisely correct image quality deterioration, which is caused under the influence of storage environmental conditions or aged deterioration of the photographic film 22. Accordingly, there can also be used a mode of application in which an image is recorded on a photographic printing paper or the like by plane exposure during first image output, and is read for the purpose of acquisition of image characteristic data and storage of the data in the cartridge IC memory 72 by a simple scanner (for example, a scanner having a low read resolution, or a photometric device for reading an image in a state of being divided into blocks of the same number as that of the aforementioned divided blocks), and only at the time of image output being carried out again after the passage of a long period in time, an image is outputted using the digital laboratory system 10 provided in the present embodiment.

Figure 6A:
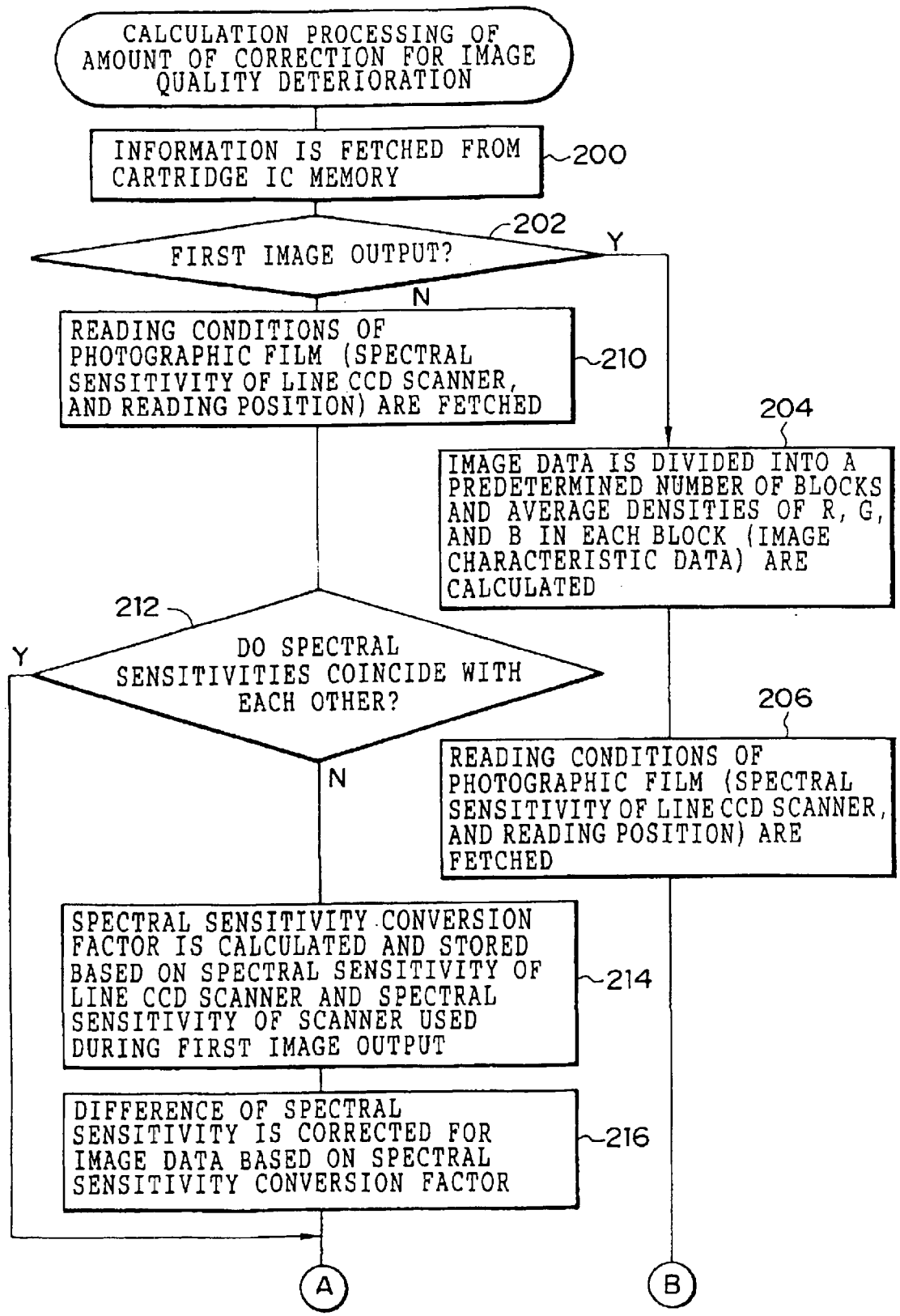
FIGS. 6A and 6B are flow charts which show an example of calculation processing of an amount of correction for image quality deterioration.
Figure 6B:
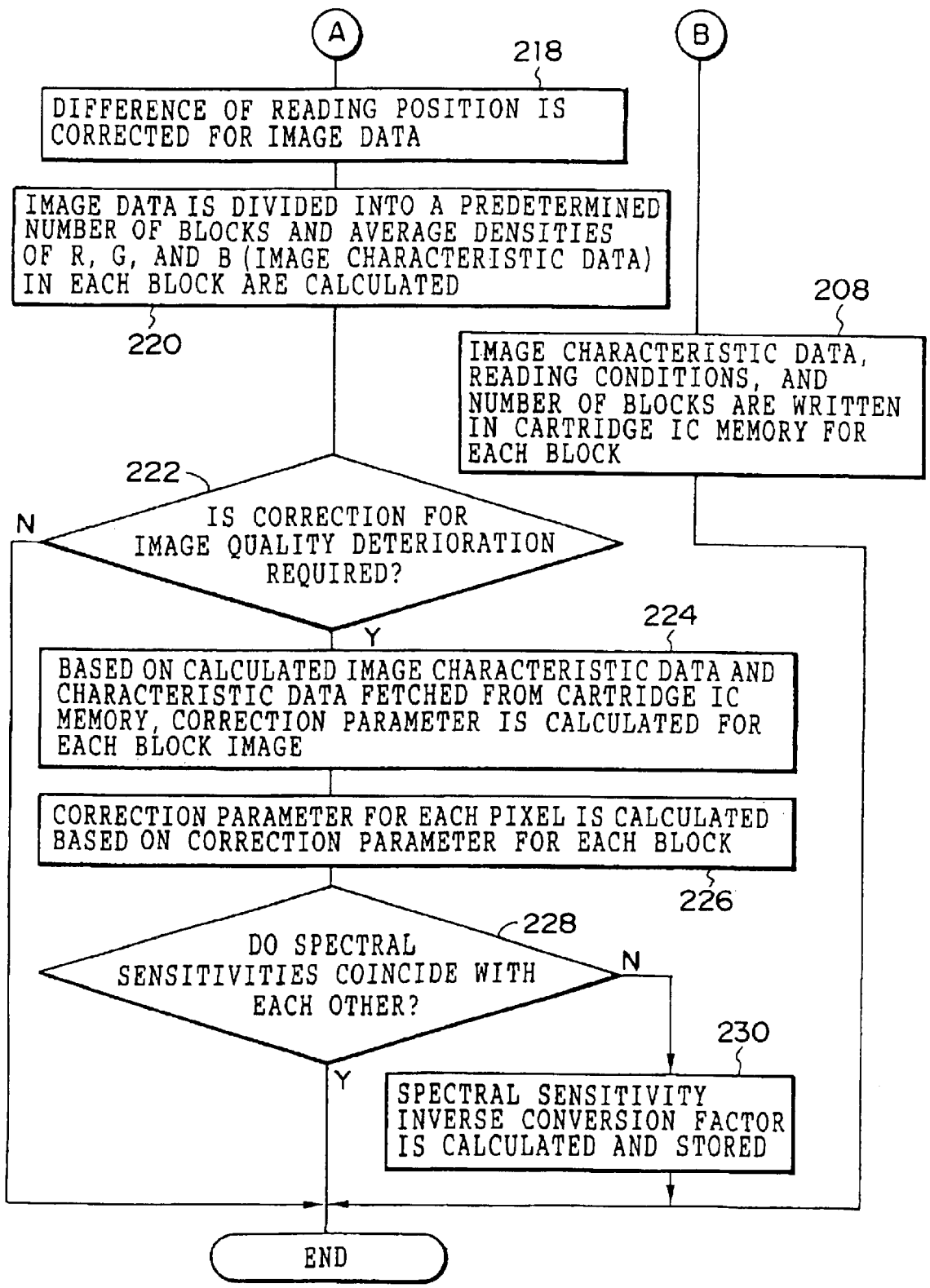

In the calculation processing of an amount of correction for image quality deterioration shown in FIGS. 6A and 6B, when the spectral sensitivity characteristics of the scanner used during the first image output and the spectral sensitivity characteristics of the line CCD scanner 14 do not coincide with each other (that is, when the decision of step 212 is made affirmative), the difference in spectral sensitivity characteristics between these scanners is corrected for the image data obtained by reading a film image using the line CCD scanner 14. However, the present invention is not limited to the same.

As an example, in the calculation processing of an amount of correction for image quality deterioration shown in FIGS. 8A and 8B (the same portions as those of the flow charts shown in FIGS. 6A and 6B will be denoted by the same reference numerals, and a description thereof will be omitted), when the decision of step 212 is made negative, in step 213, based on the spectral sensitivity characteristics of the line CCD scanner 14 and the spectral sensitivity characteristics of the scanner used during the first image output, the difference in the spectral sensitivity characteristics is corrected (the spectral sensitivity conversion factor used to convert, to image data equal to that obtained by reading using the scanner of which spectral sensitivity characteristics are the same as those of the line CCD scanner 14, image data obtained by reading using the line CCD scanner 14 and image data obtained by reading using the scanner used during the first image output).

In step 215, based on the spectral sensitivity conversion factor obtained in step 213, the difference in spectral sensitivity characteristics between the scanner used during the first image output and the line CCD scanner 14 is corrected for the image characteristic data read out from the cartridge IC memory 72. As a result, the image characteristic data read out from the cartridge IC memory 72 is converted to image characteristic data equal to that obtained by the reading using the scanner whose spectral sensitivity characteristics are the same as those of the line CCD scanner 14.

In the calculation processing of an amount of correction for image quality deterioration shown in FIGS. 8A and 8B, as described above, correction corresponding to the difference in spectral sensitivity characteristics is effected for the image characteristic data read out from the cartridge IC memory 72. Accordingly, in the image quality deterioration correcting portion 130, the spectral sensitivity conversion and spectral sensitivity inverse conversion for the inputted image data become unnecessary. As a result, processing including calculation of the spectral sensitivity characteristic inverse conversion (specifically, steps 228 and 230 in the flow charts shown in FIGS. 6A and 6B) can be omitted, and further, the structure of the image quality deterioration correcting portion 130 can be simplified and high-sped image quality correction processing by the image quality deterioration correcting portion 130 can be realized.

Further, in the calculation processing of an amount of correction for image quality deterioration shown in FIGS. 6A and 6B, as the image characteristic data, respective average densities of R, G, and B in each of a predetermined number of blocks into which an image is divided are used. However, the present invention is not limited to the same. For example, densities of R, G, and B of each of a pixel corresponding to a highlight point in each block and a pixel corresponding to a shadow point may be used as the image characteristic data. The image characteristic data corresponds to "data which indicates a predetermined image characteristic amount for each block" of the fifth aspect of the present invention.

Figure 9A:
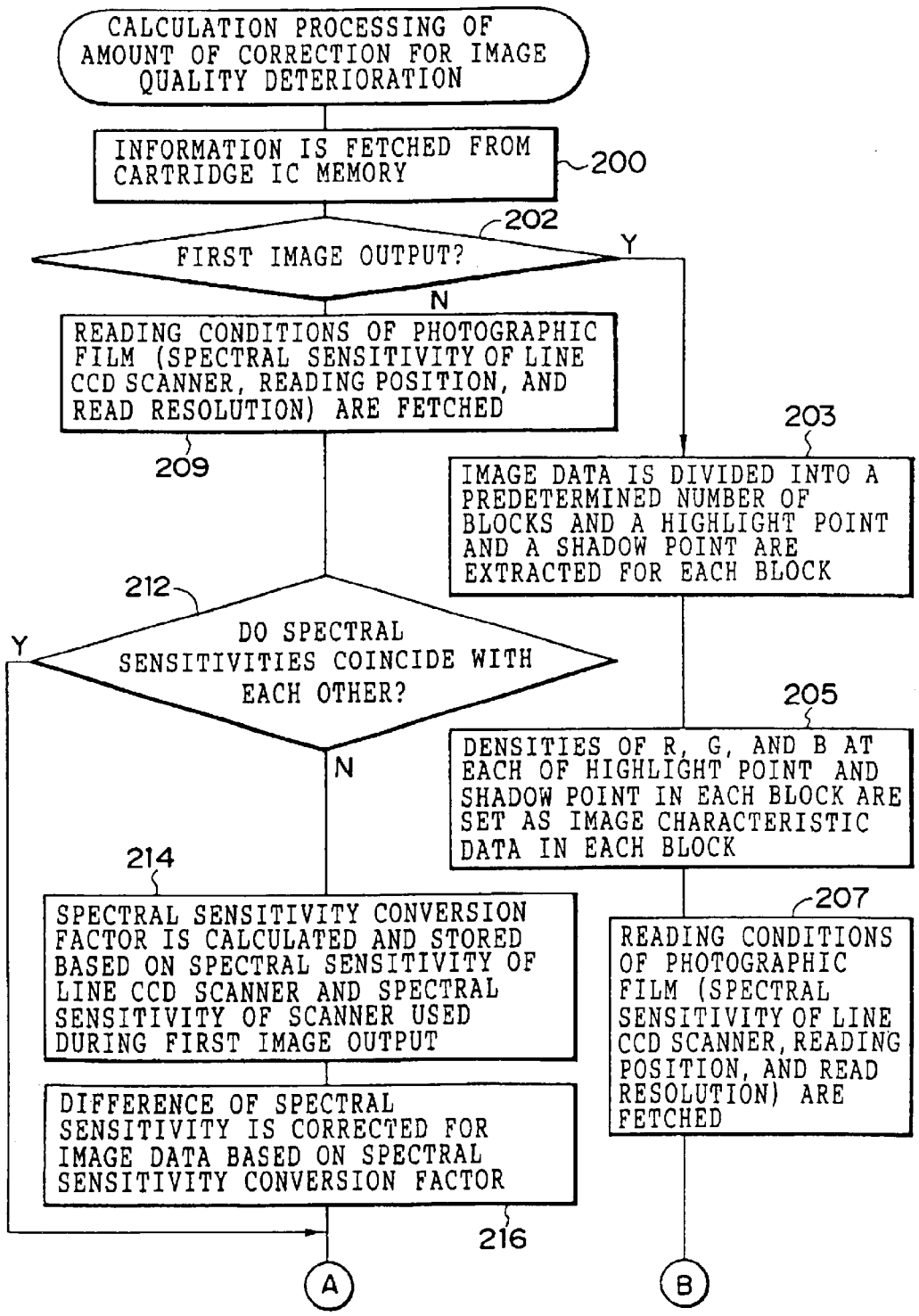

As an example, in the calculation processing of an amount of correction for image quality deterioration shown in FIGS. 9A and 9B (the same portions as those of the flow charts shown in FIGS. 6A and 6B will be denoted by the same reference numerals, and a description thereof will be omitted), when the decision of step 202 is made affirmative (that is, during the first image output), in step 203, after image data has been divided into a predetermined number of blocks, the pixel which corresponds to a highlight point in each block and the pixel which corresponds to a shadow point are extracted every block. In step 205, densities of R, G, and B ($R_H$, $G_H$, and $B_H$) of the pixel corresponding to a highlight point in each block, and densities of R, G, and B ($R_S$, $G_S$, and $B_S$) of the pixel corresponding to a shadow point in each block are set as the image characteristic data of each block.

In the subsequent step 207, in addition to the information which indicates the spectral sensitivity characteristics of the line CCD scanner 14 and the information which indicates the reading position of a film image, information which indicates a read resolution by the line CCD scanner 14 is fetched as the reading conditions by the line CCD scanner 14. In step 208, information including the image characteristic data obtained in step 205 and the data indicating the reading conditions fetched in step 207 is written in the cartridge IC memory 72 via the IC read/write device 76.

On the other hand, when image output processing is carried out again for a film image having been previously subjected to image output processing (that is, when the decision of step 202 is made negative), in step 209, in addition to the information which indicates the spectral sensitivity characteristics of the line CCD scanner 14 and the information which indicates the reading position of a film image, information which indicates a read resolution by the line CCD scanner 14 is fetched as the reading conditions by the line CCD scanner 14. In this case, in step 200, information which indicates a read resolution by the scanner used during the first image output processing is also read out from the cartridge IC memory 72.

Further, when in step 218 a difference of the reading position is corrected for image data, the process proceeds to step 234, in which the information which indicates the read resolution by the line CCD scanner 14 fetched in step 209 is compared with the information indicating the read resolution, which is read out from the cartridge IC memory 72 in step 200 (that is, information which indicates a read resolution by the scanner used for the reading of a film image during the first image output), and a determination is made as to whether respective read resolutions do not coincide with each other. When the decision of step 234 is made negative (that is, when the respective read resolutions coincide with each other), the process proceeds to step 238. When the decision of step 234 is made affirmative (that is, when the respective read resolutions do no coincide with each other), the process proceeds to step 236, in which conversion of resolution is performed for image data so that the image data becomes image data equal to that obtained by the reading at the same resolution as that of the scanner used during the first image output. As a result, it is possible to obtain image data which is equal to that obtained by reading a film image at the same resolution and spectral sensitivity characteristics as those of the scanner used during the first image output.

The conversion of resolution when the respective read resolutions do not coincide with each other (steps 234 and 236) may of course be effected in the calculation processing of an amount of correction for image quality deterioration shown in FIGS. 6 and 8 as well.

In the subsequent step 238, based on information which indicates the number of divided blocks among the information read out from the cartridge IC memory 72 in step 200, image data is divided into blocks of the same number as that of blocks during the first image output, and a pixel corresponding to a highlight point in each block and a pixel corresponding to a shadow point in each block are extracted every block. In step 240, densities of R, G, and B ($r_H$, $g_H$, and $b_H$) of the pixel corresponding to the highlight point in each block and densities of R, G, and B ($r_S$, $g_S$, and $b_S$) of the pixel corresponding to the shadow point in each block are set as the image characteristic data for each block. A determination as to whether correction for image quality deterioration is required (step 222) is made by comparing, for each block, densities of R, G, and B of the pixel corresponding to the highlight point and densities of R, G, and B of the pixel corresponding to the shadow point. When it is determined that correction for image quality deterioration is required, the process proceeds to step 224, in which correction parameters are set as described below.

Namely, when densities of R, G, and B of each of the pixel corresponding to the highlight point and the pixel corresponding to the shadow point are used as the image characteristic data, correction for image quality deterioration can be effected for data of each pixel in the same block and for each of colors R, G, and B in accordance with the following correction expressions:

$$Fr(x_R) = r1 \times x_R + r2$$

$$Fg(x_G) = g1 \times x_G + g2$$

$$Fb(x_B) = b1 \times x_B + b2$$

wherein, $x_R$, $x_G$, and $x_B$ are densities of R, G, and B of each pixel before correction, and Fr, Fg, and Fb are densities of R, G, and B of each pixel after correction. r1 and r2 respectively indicate an inclination (r1) and an offset (r2) of a straight line connecting a point of coordinates ($R_H$, $r_H$) and a point of coordinates ($R_S$, $r_S$) in a density coordinate in which density before image quality deterioration (during the first image output) is indicated by a horizontal axis and density after image quality deterioration is indicated by a vertical axis. Similarly, g1 and g2 respectively indicate an inclination (g1) and an offset (g2) of a straight line connecting a point of coordinates ($G_H$, $g_H$) and a point of coordinates ($G_S$, $g_S$) in the above-described density coordinate, and b1 and b2 respectively indicate an inclination (b1) and an offset (b2) of a straight line connecting a point of coordinates ($B_H$, $b_H$) and a point of coordinates ($B_S$, $b_S$) in the above-described density coordinate.

In order to carry out correction calculation in accordance with the aforementioned correction expressions, in step 224, based on the densities of R, G, and B ($R_H$, $G_H$, and $B_H$) of the pixel corresponding to the highlight point and the densities of R, G, and B ($R_S$, $G_S$, and $B_S$) of the pixel corresponding to the shadow point in each block during the first image output, and further based on the densities of R, G, and B ($r_H$, $g_H$, and $b_H$) of the pixel corresponding to the highlight point and the densities of R, G, and B ($r_S$, $g_S$, and $b_S$) of the pixel corresponding to the shadow point in each block after image quality deterioration, correction parameters r1, r2, g1, g2, b1, and b2 of the correction expressions are calculated for each block.

In step 226, a correction parameter for each of pixels of image data is set, by effecting setting of the same correction parameter for all pixels in the same block for each of all blocks, based on the correction parameter obtained for each block. Further, as also previously explained, the correction parameter for each pixel may be set by, for example, setting a weight for each block in which a central pixel is located within a mask having a predetermined shape with the pixel to be processed set as the center so that the weight becomes smaller as the distance between the central pixel and the pixel to be processed is made longer and a total sum of weights thereby comes to 1, and calculating a weighted additional value of the correction parameter (inclination or offset) for each block, and further, setting the calculated result as the correction parameter of the pixel to be processed. In the above-described processing as well, the correction parameters by which image quality deterioration caused by storage environmental conditions or aged deterioration of the photographic film 22 can be corrected precisely.

In the foregoing, the image characteristic data is obtained for each of a predetermined number of blocks into which an image is divided, but the present invention is not limited to the same. Single image characteristic data may be obtained from an entire image of a single image to be processed, or image characteristic data common to a plurality of images to be processed (which may be images in which the same or similar scene is shown) may be obtained from the plurality of images. In this case, the same correction value is set, as the correction parameter, for all pixels of a single image. Accordingly, even if there is a possibility that precision of correction to image quality deterioration slightly decrease, a storage capacity required for storing image characteristic data can be reduced, and the calculation of the correction parameter and the image quality correction processing by the image quality deterioration correcting portion 135 can be simplified.

Further, a mode of obtaining single image characteristic data from an entire image or obtaining image characteristic data common to a plurality of images allows correction of image quality deterioration with a sufficient precision so long as the degree of image quality deterioration in various portions of an image is fixed or substantially fixed. Accordingly, calculation of the correction parameter based on the single image characteristic data obtained from an entire one image or from a plurality of images or calculation of the correction parameter using image characteristic data obtained for each of the blocks may be selected in accordance with variations in image quality deterioration of various portions of the image. The variations in image quality deterioration may be estimated from, for example, an elapsed time from the time of the first image output. Further, in a case of using a photographic film, the variations in image quality deterioration may also be estimated from variations in density of a film base in various portions of the photographic film.

Moreover, the present embodiment was described on the assumption that a structure is provided such that an image is read in a state of being separated into three colors of R, G, and B by a scanner used during the first image output and a scanner used for reading after image quality deterioration (that is, the line CCD scanner 14). However, the present invention is not limited to the same, and any one or both of the scanners may be structured to allow reading of a film image in a state of being separated into a larger number of wavelength regions.

Figure 10A:
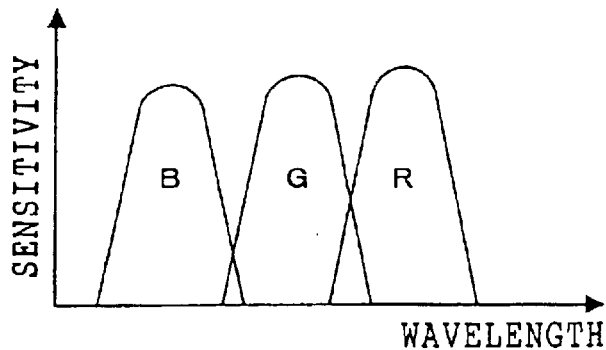
FIG. 10A is a diagram which shows an example of spectral sensitivity characteristics of a scanner at the time of first image output processing.
Figure 10B:
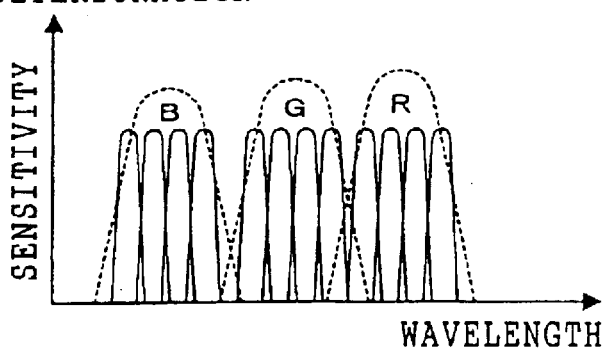
FIG. 10B is a diagram which shows an example of spectral sensitivity characteristics of a scanner used after deterioration of image quality.
Figure 10C:
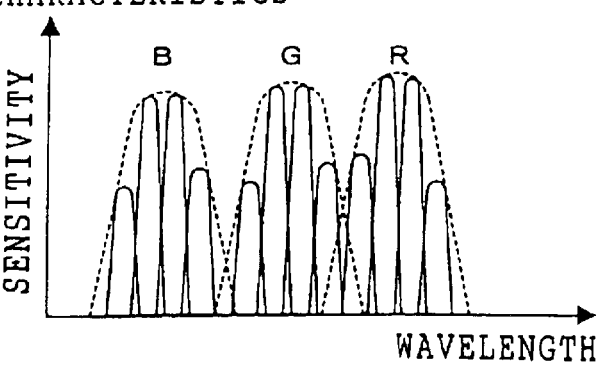
FIG. 10C is an image diagram for illustrating correction of image data corresponding to a difference of spectral sensitivity characteristics between these scanners.

For example, when the scanner used during the first image output is structured to read an image in a state of being separated into three colors of R, G, and B and has the spectral sensitivity characteristics shown in FIG. 10A and the scanner used for the reading after image quality deterioration is structured to read an image in a state of being separated into a plurality of wavelength regions for each of component colors and has the spectral sensitivity characteristics shown in FIG. 10B, correction for the difference in the spectral sensitivity characteristics can be realized by determining, as shown in FIG. 10C, a correction coefficient for each of wavelength regions so that the characteristic curve of the scanner for each wavelength region of the scanner shown in FIG. 10B inscribes the characteristic curve which indicates sensitivity characteristics of the scanner shown in FIG. 10A and by correcting the image data obtained by the reading using the scanner shown in FIG. 10B for each wavelength region in accordance with the determined correction coefficient. Subsequently, in the image data after correction, integration of data in a plurality of wavelength regions corresponding to the same component color is carried out for each of the component colors and image data of R, G, and B can thereby be obtained.

When the scanner used during the first image output is structured to read an image in such a state that an image is separated into a plurality of wavelength regions (channels) for each of component colors, so long as information such as the number of channels for reading (that is, the number of division of wavelength regions) or the spectral sensitivity of each channel is stored, as information which indicates the spectral sensitivity characteristics of the scanner, in storage means, the difference in the spectral sensitivity characteristics can be corrected, based on the stored information, with high precision during the reading after image quality deterioration. As described above, so long as at least one of the scanner used during the first image output and the scanner used for reading after image quality deterioration is structured to read an image in such a state that an image is separated into a plurality of wavelength regions for each color component, the difference in the spectral sensitivity characteristics between these scanners can be corrected with extremely high precision.

In the foregoing, the cartridge IC memory 72 embedded in the cartridge 70 is used as the storage means, but the present invention is not limited to the same. For example, a transparent magnetic layer formed on an APS film may be used as the storage means, or information storage medium such as a memory card, a CD-R, or a floppy disk, which is formed separately from a recording material such as a photographic film, may also be used as the storage means.

Further, in the foregoing, information which indicates various parameters (that is, spectral sensitivity characteristics, image reading position, resolution, and the like) which form the reading conditions is used as the information for specifying the reading conditions, but the present invention is not limited to the same. Alternatively, by using, as the information for specifying the reading condition, information which indicates the kind of a scanner used for reading, the reading conditions may be determined (specified) from the kind of a scanner which is indicated by the information. For example, when the reading conditions (the spectral sensitivity and the like) of the scanner based on a specific standard (for example, a standard regulated by ISO such as NTSC or status A) is fixed, so long as it is confirmed that the scanner used for the reading is a scanner based on any standard, the reading conditions can be specified. Accordingly, information which indicates the scanner used for the reading is a scanner based on any standard may be stored, as the information for specifying the reading conditions, in the storage means.

Moreover, the aforementioned calculation processing of an amount of correction for image quality deterioration was described on the assumption that there is a possibility of reading conditions in the reading during the first image output and reading conditions in the reading after image quality deterioration differ from each other. However, when it is assured that respective reading conditions in the reading during the first image output and in the reading after image quality deterioration coincide with each other, only correction for image quality deterioration based on the difference of image characteristic data may merely be carried out without storing the information for specifying the reading condition in the storage means such as the cartridge IC memory 72 and without effecting correction for a difference of reading conditions for at least one of the image data obtained by reading after image quality deterioration and the image characteristic data obtained from a result of reading during the first image output. The first aspect of the present invention also covers the aforementioned mode in the claims.

What is claimed is:

1. An image processing apparatus comprising:
   reading means for reading an image recorded on a recording material and obtaining a current image characteristic data of the image;
   acquisition means for acquiring a former image characteristic data which was obtained based on a result of a reading of the image and stored in storage means in a previous image processing session;

calculation means which calculates, based on the current image characteristic data and the former image characteristic data, a correction parameter for correcting image quality deterioration of the image; and correction means which corrects, based on the correction parameter calculated by said calculation means, the image data.

2. An image processing apparatus comprising:

reading means for reading an image recorded on a recording material and obtaining current image data of the image;

acquisition means for acquiring a former image characteristic data which was obtained based on a result of a reading of the image in a previous image processing session, and acquiring information for specifying former reading conditions of the previous image processing session, the former image characteristic data and the former reading conditions being stored in storage means during the previous image processing session;

calculation means which, based on the former reading conditions, converts the current image data so that the converted image data is substantially equal to an image data that would have been obtained by reading the image under the former reading conditions, and thereafter, obtains a current image characteristic data from the converted image data, and based on both the current and former image characteristic data, calculates a correction parameter for correcting image quality deterioration of the image; and correction means which, based on the correction parameter calculated by said calculation means, corrects the image data.

3. An image processing apparatus according to claim 2, wherein the reading conditions include at least one of an image reading position on the recording material, a spectral sensitivity of said reading means used for reading, and a resolution at which the image is read.

4. An image processing apparatus according to claim 1, wherein the recording material is a photographic film and the storage means is any one of a semiconductor memory mounted to a cartridge in which the photographic film is accommodated, and a magnetic recording layer formed with a magnetic material being applied to the photographic film.

5. An image processing apparatus according to claim 2, wherein the recording material is a photographic film and the storage means is any one of a semiconductor memory mounted to a cartridge in which the photographic film is accommodated, and a magnetic recording layer formed with a magnetic material being applied to the photographic film.

6. An image processing apparatus according to claim 1, wherein the image characteristic data is data which represents a predetermined image characteristic amount for each of a fixed number of blocks into which the image is divided, and said calculation means compares image characteristic data obtained from the image data and image characteristic data acquired by said acquisition means for each of the blocks and calculates the correction parameter for each of the blocks.

7. An image processing apparatus according to claim 2, wherein the image characteristic data is data which represents a predetermined image characteristic amount for each of a fixed number of blocks into which the image is divided, and said calculation means compares image characteristic data obtained from the image data and image characteristic data acquired by said acquisition means for each of the blocks and calculates the correction parameter for each of the blocks.

8. An image correcting method comprising the steps of:

reading an image recorded on a recording material and determining a current image characteristic data based on a result of the reading;

determining whether or not the image has been read in a previous image processing session;

if it is determined that the image has not been read in the previous image processing session, then storing the obtained current image characteristic data in storage means; and if it is determined that the image has been read in the previous image processing session, then:

obtaining a former image characteristic data from the storage means;

calculating a correction parameter for correcting image quality deterioration of the image based on the current and former image characteristic data; and correcting the image data based on the calculated correction parameter.

9. An image correcting method comprising the steps of:

effecting a first reading for an image recorded on a recording material in a first image processing session;

obtaining a first image characteristic data based on a result of the first reading; and storing, in storage means, the obtained first image characteristic data together with a first information for specifying reading conditions in the first reading, and thereafter, when a second reading is effected for the image recorded on the recording material in a second image processing session, based on the information for specifying reading conditions in the first reading, converting the image data obtained by the second reading so that the image data becomes substantially equal to data that would have been obtained by reading the image under similar conditions substantially equal to conditions specified in the first information, and thereafter, obtaining a second image characteristic data from the converted image data;

based on both first and second image characteristic data, calculating a correction parameter for correcting image quality deterioration of the image; and correcting the image data based on the calculated correction parameter.

10. An image correcting method according to claim 9, wherein the reading conditions include at least one of an image reading position on the recording material, a spectral sensitivity of reading means used for reading, and a resolution at which the image is read.

11. An image correcting method according to claim 8, wherein the recording material is a photographic film and the storage means is any one of a semiconductor memory mounted to a cartridge in which the photographic film is accommodated, and a magnetic recording layer formed with a magnetic material being applied to the photographic film.

12. An image correcting method according to claim 9, wherein the recording material is a photographic film and the storage means is any one of a semiconductor memory mounted to a cartridge in which the photographic film is accommodated, and a magnetic recording layer formed with a magnetic material being applied to the photographic film.

13. An image correcting method according to claim 8, wherein the image characteristic data is data which represents a predetermined image characteristic amount for each of a fixed number of blocks into which the image is divided, and said calculation step of the correction parameter is provided to compare image characteristic data obtained form the image data and the image characteristic data stored in the storage means for each of the blocks and calculate the correction parameter for each of the blocks.

14. An image correcting method according to claim 9, wherein the image characteristic data is data which represents a predetermined image characteristic amount for each of a fixed number of blocks into which the image is divided, and said calculation step of the correction parameter is provided to compare the both image characteristic data with each other for each of the blocks and calculate the correction parameter for each of the blocks.

15. An image processing method, comprising:

scanning an image initially recorded on a recording material to output a current image data;

retrieving initial image characteristics data and initial imaging conditions data of the image, wherein the initial imaging conditions data correspond to conditions upon which the image was scanned in a previous image processing session; and processing the current image data based on the initial image characteristics data and the initial imaging conditions data for outputting a corrected image data of the current image data.

16. The method of claim 15, wherein:

the image is divided into a plurality of blocks such that initial image characteristics data include a plurality of initial block characteristics data corresponding to each block of the image; and the initial imaging conditions include at least one of a spectral sensitivity of an initial scanner used in the initial recording, an initial resolution, and an initial position of the image on the recording material.

17. The method of claim 16, wherein block characteristics data includes at least one of average densities of color components within the block, color densities of a pixel determined to be a high light point of the block, and color densities of a pixel determined to be a shadow point of the block.

18. The method of claim 16, wherein the processing step comprises:

compensating for differences between the initial imaging conditions and current imaging conditions;

determining whether a correction of the current image data is required based on a result of the compensating step; and correcting the current image data based on a result of the determining step.

19. The method of claim 18, wherein the compensating step comprises at least one of:

determining whether the spectral sensitivities of the initial scanner and a current scanner coincide and calculating a spectral sensitivity conversion factor when it is determined that the spectral sensitivities do not coincide; and determining whether an initial reading position of the image on the recording material and a current reading position are different and correcting the current reading position when it is determined that the reading positions are different.

20. The method of claim 19, wherein the compensating step further comprises determining whether an initial resolution and a current resolution are different and calculating a resolution correcting factor when it is determined that the resolutions are different.

21. The method of claim 18, wherein the step of determining whether a correction of the current image data is required comprises:

dividing the current image data into a plurality of blocks;

determining a plurality of current block characteristics data for each block of the current image data;

comparing each current block characteristics data with corresponding initiation block characteristics data; and outputting a result based on the comparing step.

22. The method of claim 21, wherein the outputting step comprises outputting a positive result if at least one current block characteristics data differs from the corresponding initial block characteristics data by a preset value or more.

23. The method of claim 18, wherein the correcting step comprises:

dividing the current image data into a plurality of blocks;

calculating a block correction factor for each block of the current image data based on a difference between the current block characteristics data and the corresponding initiation block characteristics data; and correcting each pixel of each block of the current image data based on the corresponding block correction factor.

24. The method of claim 23, further comprising:

determining whether the spectral sensitivities of the initial scanner and a current scanner coincide; and performing an inverse conversion of the corrected image data when it is determine that the spectral sensitivities do not coincide.

* * * * *